(12) United States Patent
Schilders

(10) Patent No.: US 12,518,047 B2
(45) Date of Patent: Jan. 6, 2026

(54) DYNAMIC SECURITY FOR GRAPH-BASED MODELS

(71) Applicants: INFOSYS LIMITED, Bangalore (IN); INVERTIT INC., Columbus, IN (US)

(72) Inventor: Steven Schilders, Columbus, IN (US)

(73) Assignees: Infosys Limited, Bangalore (IN); InvertIT Inc., Columbus, IN (US)

( * ) Notice: Subject to any disclaimer, the term of this patent is extended or adjusted under 35 U.S.C. 154(b) by 40 days.

(21) Appl. No.: 18/589,268

(22) Filed: Feb. 27, 2024

(65) Prior Publication Data

US 2024/0289484 A1 Aug. 29, 2024

Related U.S. Application Data

(60) Provisional application No. 63/448,831, filed on Feb. 28, 2023, provisional application No. 63/448,743, filed on Feb. 28, 2023, provisional application No. 63/448,738, filed on Feb. 28, 2023, provisional application No. 63/448,711, filed on Feb. 28, 2023, provisional application No. 63/448,724, filed on Feb. 28, 2023.

(51) Int. Cl.
*G06F 21/62* (2013.01)
*G06F 16/901* (2019.01)

(52) U.S. Cl.
CPC ...... *G06F 21/6227* (2013.01); *G06F 16/9024* (2019.01)

(58) Field of Classification Search
CPC .......... G06F 21/6227; G06F 16/9024
See application file for complete search history.

(56) References Cited

U.S. PATENT DOCUMENTS

| | | | | |
|---|---|---|---|---|
| 6,467,080 B1 * | 10/2002 | Devine | ............ | G06F 9/453 715/236 |
| 10,607,025 B2 * | 3/2020 | Rasmussen | ............ | H04L 9/0891 |
| 12,069,101 B2 * | 8/2024 | Salman | ............ | H04L 63/205 |
| 2007/0297430 A1 * | 12/2007 | Nykanen | ............ | H04W 12/069 370/408 |
| 2024/0296244 A1 * | 9/2024 | Hilliard | ............ | G06F 21/6227 |
| 2024/0305640 A1 * | 9/2024 | Johnston | ............ | H04L 41/0894 |

FOREIGN PATENT DOCUMENTS

WO WO-2024044522 A1 * 2/2024 ......... G06F 21/6227

* cited by examiner

*Primary Examiner* — Michael Won
(74) *Attorney, Agent, or Firm* — Finnegan, Henderson, Farabow, Garrett & Dunner, LLP

(57) ABSTRACT

An overlay system including processing circuitry and storage element that stores various base nodes and various security overlay nodes, is provided. Each base node is associated with one or more security overlay nodes that control access to the information value contained in the base node. The processing circuitry receives a contextualized stimulus that indicates a requirement for associating two or more nodes. The processing circuitry identifies two base nodes required for processing the contextualized stimulus and executes an operation on the two identified base nodes to create an aggregated node. Thus, the aggregated node contains a higher information value than the two identified base nodes. Consequently, the processing circuitry dynamically associates, with the aggregated node, one or more security overlay nodes that have an equal or higher security level than the security levels of security overlay nodes associated with the two identified base nodes.

20 Claims, 12 Drawing Sheets

DYNAMIC SECURITY FOR GRAPH-BASED MODELS

CROSS-REFERENCE TO RELATED APPLICATIONS/INCORPORATION BY REFERENCE

This patent application refers to, claims priority to, and claims the benefit of U.S. Provisional Application Ser. No. 63/448,738, filed Feb. 28, 2023; 63/448,724, filed Feb. 28, 2023; 63/448,831, filed Feb. 28, 2023; 63/448,711, filed Feb. 28, 2023; and 63/448,743, filed Feb. 28, 2023. Each of the above-referenced applications is hereby incorporated herein by reference in its entirety.

FIELD OF THE DISCLOSURE

Various embodiments of the present disclosure relate generally to graph-based models. More specifically, various embodiments of the present disclosure relate to dynamic security for executable graph-based models.

BACKGROUND

In the present era, data has become one of the most crucial resources or byproducts in domains such as healthcare, finance, robotics, or the like. Data associated with a domain is stored in an associated database. Notably, the data may be sensitive and confidential as it may include trade secrets, research information, customer data, or the like. Therefore, the data is required to be secured and protected from unauthorized access. Traditionally, to protect the data stored in the database, a single-layer security mechanism is implemented for the entire database. This approach, however, faces numerous challenges. For example, a single security breach leads to the entire database getting exposed. Further, the database may include data associated with multiple users. An unauthorized access of data associated with one user leaves the data associated with the remaining users vulnerable.

In light of the foregoing, there exists a need for a technical and reliable solution that overcomes the abovementioned problems.

Limitations and disadvantages of conventional and traditional approaches will become apparent to one of skill in the art, through the comparison of described systems with some aspects of the present disclosure, as set forth in the remainder of the present application and with reference to the drawings.

SUMMARY

Methods and systems for facilitating dynamic security for executable graph-based models are provided substantially as shown in, and described in connection with, at least one of the figures.

These and other features and advantages of the present disclosure may be appreciated from a review of the following detailed description of the present disclosure, along with the accompanying figures in which like reference numerals refer to like parts throughout.

BRIEF DESCRIPTION OF THE DRAWINGS

Embodiments of the present disclosure are illustrated by way of example and are not limited by the accompanying figures. Similar references in the figures may indicate similar elements. Elements in the figures are illustrated for simplicity and clarity and have not necessarily been drawn to scale.

DETAILED DESCRIPTION

Figure 1:
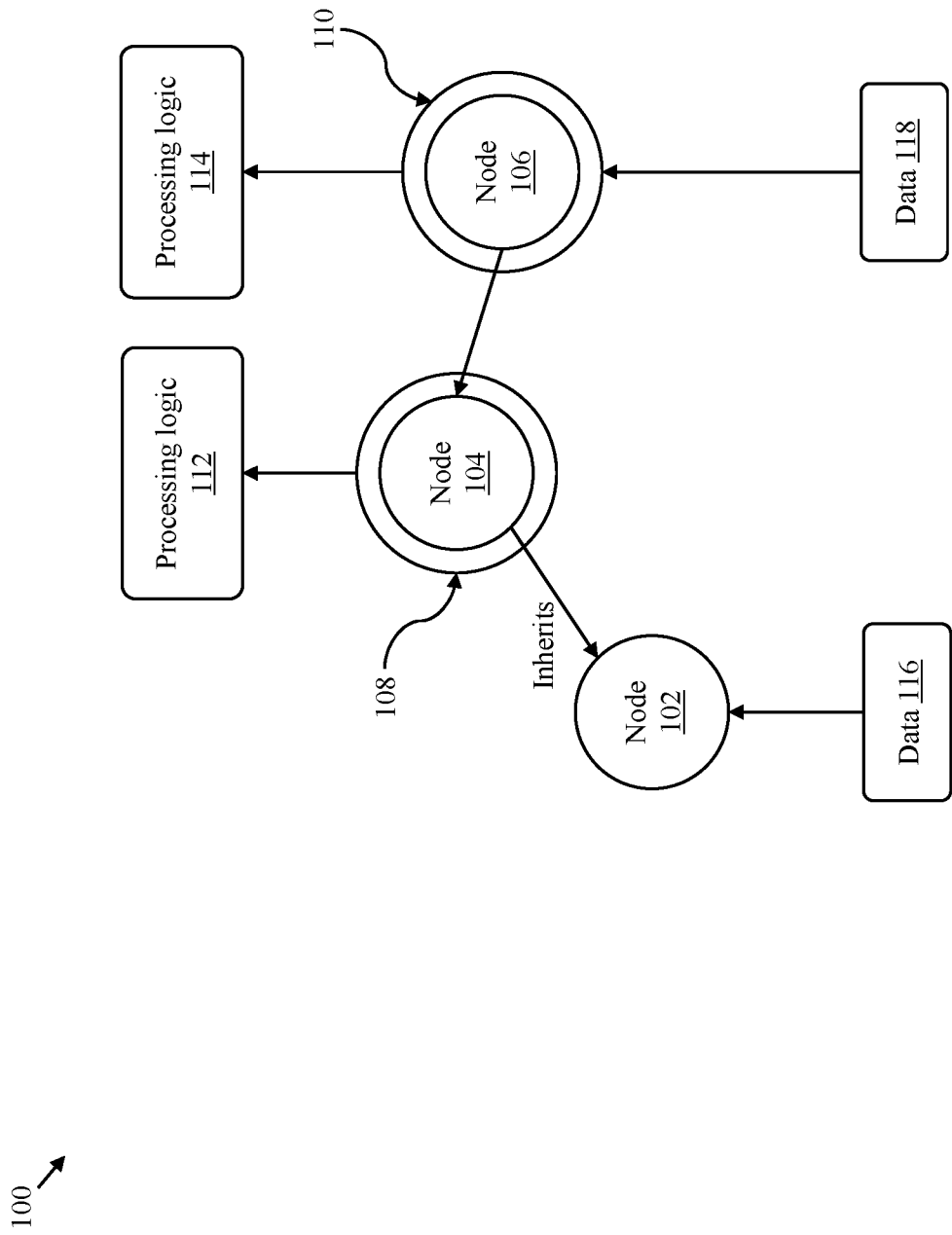
FIG. 1 is a graph that illustrates a composition of an executable graph-based model, in accordance with an embodiment of the present disclosure.

The detailed description of the appended drawings is intended as a description of the embodiments of the present disclosure and is not intended to represent the only form in which the present disclosure may be practiced. It is to be understood that the same or equivalent functions may be accomplished by different embodiments that are intended to be encompassed within the spirit and scope of the present disclosure.

Overview

Traditionally, a database is protected by a security technique that is applied globally. That is to say, a single layer of protection is associated with the entire database. The database may contain information associated with multiple users. Thus, an unauthorized access to data associated with one user leaves data associated with other users vulnerable. The data in the database is stored in the form of data records, such that one data record may contain a higher information value than the other. However, the single security technique applied globally provides equal security to all the data records, regardless of the importance of the information and the confidentiality associated therein. In certain scenarios, when a user requests to access some instances of the database, the entire data stored in the database is accessible to the user. However, not all the instances of the database are required by the user or should be accessible to the user. Therefore, such exposure of the entire database may lead to unauthorized access to the database, and in turn, exploitation of data contained in the database.

The present disclosure is directed to the facilitation of dynamic security for executable graph-based models of an overlay system. The executable graph-based model is a customized hypergraph having vertices and hyper-edges that are realized by way of executable nodes. Each executable node is a base node that is extended by way of one or more overlays. Overlays incorporate in-situ processing functionality in the overlay system. Each executable node is associated with a particular node type. For example, an edge node corresponds to a base node with an edge node type. Nodes (for example, base nodes and executable nodes) are connected with other nodes by way of roles included in an edge node therebetween. In some embodiments, roles are represented by way of nodes of role node type. Role nodes between two nodes may be indicative of a context regarding an association therebetween. For implementation of dynamic security, one or more nodes, of the executable graph-based model, that are required to be secured are extended by way of corresponding overlay nodes (for example, security overlay nodes) that include processing logic to apply one or more security techniques to the corresponding nodes.

The executable graph-based model may be used to implement a dataset associated with the overlay system. The dataset may include a plurality of data records such that each data record may be stored at a corresponding base node. A base node storing a data record is extended to have one or more security overlay nodes based on the confidentiality of the data record. That is to say that, the higher the confidentiality, the higher will be the security level of security overlay nodes. Moreover, the confidentiality of the data record may vary with time. Therefore, based on a change in confidentiality (e.g., importance) of the data record, the security level of the security overlay nodes associated with the data record may also vary. To summarize, the overlay system disclosed herein allows for each node to be secured based on the confidentiality of the data record stored therein. Hence, the security provided to the dataset implemented by way of the overlay system of the present disclosure is dynamic.

In operation, processing circuitry of the overlay system may receive a stimulus that is indicative of a request to access a first data record of the dataset. The processing circuitry may identify, in the executable graph-based model, a first data record (e.g., a first node that stores the first data record) based on a context of the stimulus. Based on one or more security overlay nodes associated with the first node and the characteristics of the stimulus (e.g., role and user types requesting access, a type of access, or the like), the processing circuitry may be configured to authorize or decline the access to the first data record.

The present disclosure allows for facilitation of dynamic security for executable graph-based models by associating one or more security overlay nodes to each node storing a data record of a dataset. The association of security overlay nodes with each node allows the user to only access the required data record, thereby limiting access to the entire database. Also, the data records that contain higher information value are associated with higher security, thereby adding more security to confidential and sensitive data. Thus, the systems and methods disclosed herein provide an efficient approach for implementing dynamic security for executable graph-based models.

Notably, the present disclosure allows for the facilitation of dynamic security for the overlay system which allows each data record to be secured based on the degree of confidentiality or sensitivity associated therewith. Further, the dynamic adjustment of the security level of each data record ensures a robust security mechanism. In contrast to the traditional security technique where data once loaded in application space is no longer secured (e.g., as data is decrypted prior to loading), the present disclosure provides security to each data record when offline (data-at-rest) as well as can be applied in real-time when loaded into the executable graph-based model. Additionally, as the security mechanism is implemented for each data record, a security breach at one data record does not leave other records vulnerable. The application area of the present disclosure may include any domain that utilizes external service providers (for example, software development, database management systems, machine learning, robotics, or the like).

Figure Description

FIG. 1 is a graph that illustrates a composition of an executable graph-based model 100, in accordance with an embodiment of the present disclosure. Referring to FIG. 1, the executable graph-based model 100 is generally formed of a data structure (e.g., a graph-based model or a graphical model) comprising a plurality of nodes 102-106 which can be functionally extended with processing logic via the use of overlays. For example, as shown in FIG. 1, the nodes 104 and 106 are functionally extended with processing logic via the use of overlays 108 and 110, respectively. Although not shown, it will be apparent to a person skilled in the art that the node 102 can be similarly extended with processing logic via the use of one or more overlays. Each overlay includes processing logic, such as processing logic 112 and 114 which are associated with the overlays 108 and 110, respectively. At run-time, data, such as data 116 and 118, is associated with the nodes 102 and 106, respectively, of the executable graph-based model 100. Further, the overlays 108 and 110 of the nodes 104 and 106, respectively, provide the functionality to respond to stimuli and interact with, manipulate, or otherwise process the data for facilitating dynamic security for the executable graph-based model 100. Further, the node 104 inherits the node 102, and hence, also inherits the data 116 which is associated with the node 102. In some embodiments, the node 102 may be extended to have one or more overlays. In such embodiments, the node 104 may further inherit the overlays of the node 102.

Each element within the executable graph-based model 100 (both the data and the processing functionality) is implemented by way of a node. A node forms the fundamental building block of all executable graph-based models. A node may be an executable node. A node that is extended by way of an overlay forms an executable node. One or more nodes are extended to include overlays in order to form the executable graph-based models. As such, the executable graph-based model 100 includes one or more nodes that can be dynamically generated, extended, or processed by one or more other modules within an overlay system (shown in FIG. 2).

As such, the structure and functionality of the data processing are separate from the data itself when offline (or at rest) and are combined dynamically at run-time. The executable graph-based model 100 thus maintains the separability of the data and the processing logic when offline. Moreover, by integrating the data and the processing logic within a single model, processing delays or latencies are reduced because the data and the processing logic exist within the same logical system. Therefore, the executable graph-based model 100 is applicable to a range of time-critical systems where efficient processing of the stimuli is required. In an instance, the executable graph-based model 100 may be used for in-situ processing of stimuli such as a command, a query, or the like.

Figure 2:
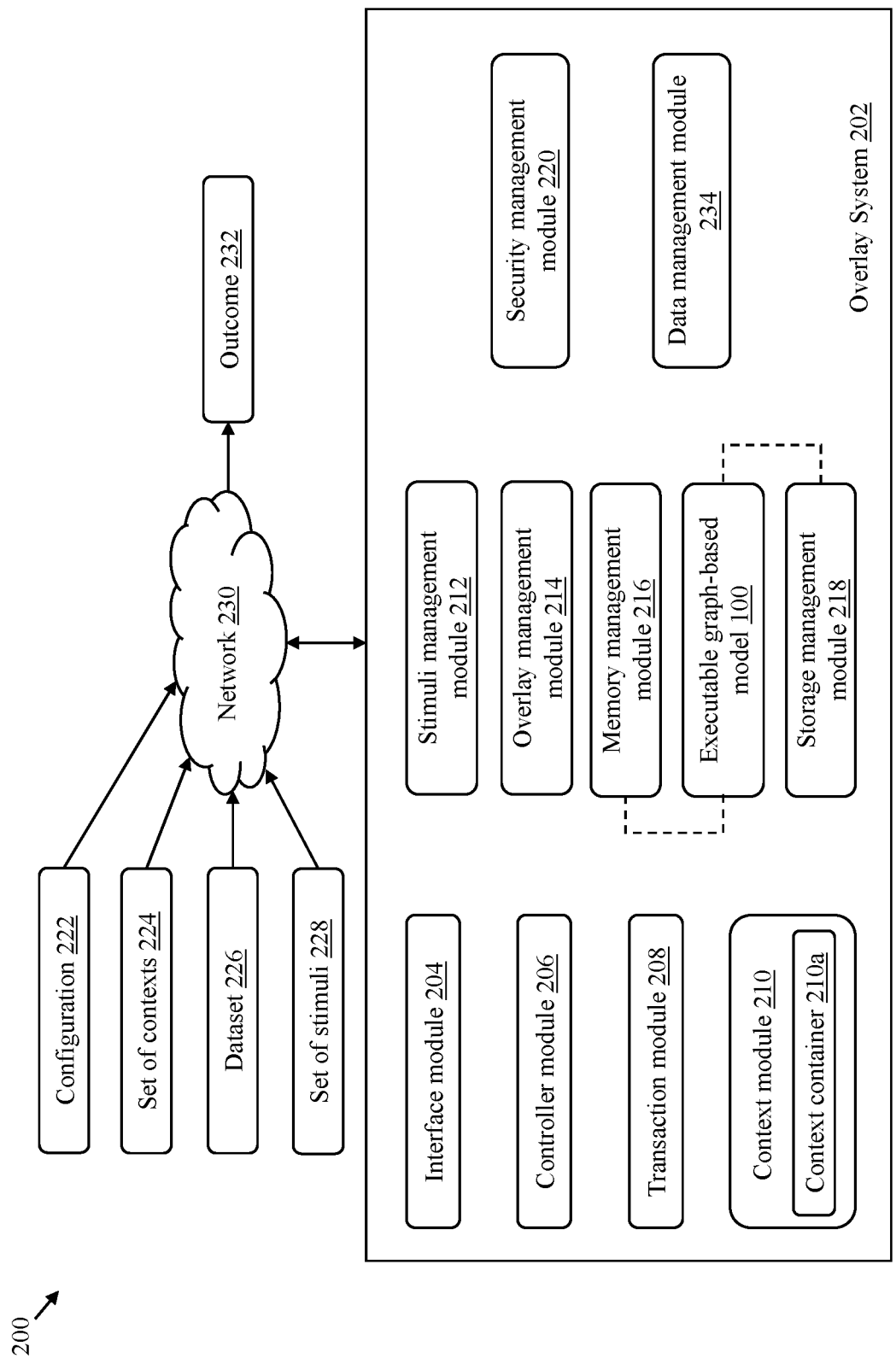
FIG. 2 is a block diagram that illustrates a system environment of an overlay system for execution, management, and configuration of the executable graph-based model of FIG. 1, in accordance with an embodiment of the present disclosure.

FIG. 2 is a block diagram that illustrates a system environment 200 of an overlay system 202 for execution, management, and configuration of the executable graph-based model 100, in accordance with an embodiment of the present disclosure. Referring to FIG. 2, the overlay system 202 includes the executable graph-based model 100. The overlay system 202 further includes an interface module 204, a controller module 206, a transaction module 208, a context module 210, a stimuli management module 212, an overlay management module 214, a memory management module 216, a storage management module 218, and a security management module 220. FIG. 2 further shows a configuration 222, a set of contexts 224, a dataset 226, a set of stimuli 228, a network 230, and an outcome 232. Additionally, the overlay system 202 of the present disclosure includes a data management module 234. In some embodiments, all modules of the overlay system 202 except for the executable graph-based model 100 may collectively form processing circuitry for implementing dynamic security for executable graph-based models.

The overlay system 202 may include suitable logic, circuitry, interfaces, and/or code, executable by the circuitry, that may be configured to facilitate dynamic security for graph-based models (such as the executable graph-based model 100). The executable graph-based model 100 corresponds to an application-specific combination of data and processing functionality which is manipulated, processed, and/or otherwise handled by other modules within the overlay system 202 for generation, maintenance, and utilization of dynamic security mechanisms therein, based on the set of stimuli 228 received by the overlay system 202. Each stimulus in the set of stimuli 228 corresponds to a command or a query.

The interface module 204 may include suitable logic, circuitry, interfaces, and/or code, executable by the circuitry, configured to provide a common interface between internal modules of the overlay system 202 and/or external sources. The interface module 204 provides an application programmable interface (API), scripting interface, or any other suitable mechanism for interfacing externally or internally with any module of the overlay system 202. As shown in FIG. 1, the configuration 222, the set of contexts 224, the dataset 226, and the set of stimuli 228 are received by the interface module 204 via the network 230. Similarly, outputs produced by the overlay system 202, such as the outcome 232, are passed by the interface module 204 to the network 230 for consumption or processing by external systems. In one embodiment, the interface module 204 supports one or more messaging patterns or protocols such as the simple object access protocol (SOAP), the representational state transfer (REST) protocol, or the like. The interface module 204 thus allows the overlay system 202 to be deployed in any number of application areas, operational environments, or architecture deployments. Although not illustrated in FIG. 1, the interface module 204 is communicatively coupled (e.g., connected either directly or indirectly) to one or more other modules or elements within the overlay system 202 (such as the controller module 206, the context module 210, the executable graph-based model 100, or the like). In one embodiment, the interface module 204 is communicatively coupled (e.g., connected either directly or indirectly) to one or more overlays within the executable graph-based model 100.

The controller module 206 may include suitable logic, circuitry, interfaces, and/or code, executable by the circuitry, configured to handle and process interactions and executions within the overlay system 202. As will be described in more detail below, stimuli (such as the set of stimuli 228) and their associated contexts (e.g., the set of contexts 224) provide the basis for all interactions within the executable graph-based model 100. Processing of such stimuli may lead to the execution of processing logic associated with one or more overlays within the executable graph-based model 100. The processing of the stimuli within the overlay system 202 may be referred to as a system transaction. The processing and execution of stimuli (and associated overlay execution) within the overlay system 202 is handled by the controller module 206. The controller module 206 manages all received input stimuli and processes them based on a corresponding context. Each context determines the priority that is assigned to process the corresponding stimulus by the controller module 206 or the context module 210. This allows each stimulus to be configured with a level of importance and prioritization within the overlay system 202.

The controller module 206 may maintain the integrity of the modules within the overlay system 202 before, during, and after a system transaction. The transaction module 208, which is associated with the controller module 206, is responsible for maintaining the integrity of the overlay system 202 through the lifecycle of a transaction. Maintaining system integrity via the controller module 206 and the transaction module 208 allows a transaction to be rolled back in the event of an expected or unexpected software or hardware fault or failure. The controller module 206 is configured to handle the processing of the set of stimuli 228 and transactions through architectures such as parallel processing, grid computing, priority queue techniques, or the like. In one embodiment, the controller module 206 and the transaction module 208 are communicatively coupled (e.g., connected either directly or indirectly) to one or more overlays within the executable graph-based model 100.

As stated briefly above, the overlay system 202 utilizes a context-driven architecture whereby the set of stimuli 228 within the overlay system 202 is associated with the set of contexts 224 which is used to adapt the handling or processing of the set of stimuli 228 by the overlay system 202. The handling or processing of the set of stimuli 228 is done based on the set of contexts 224 associated therewith. Hence, each stimulus of the set of stimuli 228 is considered to be a contextualized stimulus. The set of contexts 224 may include details such as username, password, access token, device information, time stamp, one or more relevant identifiers, or the like, that are required to process the set of stimuli 228 in the overlay system 202. Each context within the overlay system 202 may be extended to include additional information that is required for the processing of the corresponding stimulus (e.g., a query or a command).

The context module 210 may include suitable logic, circuitry, interfaces, and/or code, executable by the circuitry, configured to manage the handling of contexts within the overlay system 202, and is responsible for processing any received contexts (e.g., the set of contexts 224) and translating the received context to an operation execution context. In some examples, the operation execution context is larger than the received context because the context module 210 supplements the received context with further information necessary for the processing of the received context. The context module 210 passes the operational execution context to one or more other modules within the overlay system 202 to facilitate dynamic security for the executable graph-based model 100. Contexts within the overlay system 202 can be external or internal. While some contexts apply to all application areas and problem spaces, some applications may require specific contexts to be generated and used to process the received set of stimuli 228. As will be described in more detail below, the executable graph-based model 100 is configurable (e.g., via the configuration 222) so as only to execute within a given execution context for a given stimulus.

As shown, the context module 210 includes a context container 210a that includes a set of defined contexts. Each defined context pertains to a context that is associated with one or more operations for facilitating dynamic security in the overlay system 202. That is to say that, one or more contexts of the set of defined contexts are indicative of the one or more operations to be executed for performing one or more tasks to enable dynamic security in the overlay system 202. The set of defined contexts may include at least one of a node association context, a node addition context, and a node access context. The node association context may be indicative of enabling the association of two or more nodes of the overlay system 202. The node addition context may be indicative of enabling the addition of a node in the overlay system 202. The node access context may be indicative of enabling access to a node in the overlay system 202.

The stimuli management module 212 may include suitable logic, circuitry, interfaces, and/or code, executable by the circuitry, configured to process externally received stimuli (e.g., the set of stimuli 228) and any stimuli generated internally from any module within the overlay system 202. The stimuli management module 212 is communicatively coupled (e.g., connected either directly or indirectly) to one or more overlays within the executable graph-based model 100 to facilitate stimuli processing within the executable graph-based model 100. The overlay system 202 utilizes different types of stimuli such as a command (e.g., a transactional request), a query, or an event received from an external system such as an Internet-of-Things (IoT) device. As previously stated, each stimulus of the set of stimuli 228 can be either externally or internally generated. In an example, each stimulus of the set of stimuli 228 may be a message that is internally triggered (generated) from any of the modules within the overlay system 202. Such internal generation of the set of stimuli 228 indicates that something has happened within the overlay system 202 such that subsequent handling by one or more other modules within the overlay system 202 may be required. An internal set of stimuli 228 can also be triggered (generated) from the execution of processing logic associated with overlays within the executable graph-based model 100. In another example, the set of stimuli 228 may be externally triggered and may be generated based on an input received via a user interface associated with the controller module 206. The externally triggered set of stimuli 228 may be received in the form of a textual, audio, or visual input. The externally triggered set of stimuli 228 may be associated with the intent of a user to execute a set of operations indicated by the set of stimuli 228. The operation is executed in accordance with the information included in the set of contexts 224 associated with the set of stimuli 228.

The stimuli management module 212 may receive the set of stimuli 228 in real-time or near-real-time, and communicate the received set of stimuli 228 to one or more other modules or nodes of the executable graph-based model 100. In some examples, the stimuli are scheduled in a batch process. The stimuli management module 212 utilizes any suitable synchronous or asynchronous communication architectures or approaches in communicating the stimuli (along with associated information). The stimuli within the overlay system 202 are received and processed (along with a corresponding context) by the stimuli management module 212, which then determines the processing steps to be performed for the execution of an operation associated with each stimulus of the set of stimuli 228. In one embodiment, the stimuli management module 212 processes the received stimuli in accordance with a predetermined configuration (e.g., the configuration 222) or dynamically determines what processing needs to be performed based on the contexts (e.g., the set of contexts 224) associated with the stimuli and/or based on a state of the executable graph-based model 100. The state of the executable graph-based model 100 refers to the current state of each node of the executable graph-based model 100 at a given point in time. The state of the executable graph-based model 100 is dynamic, and hence, may change in response to the execution of an operation based on any of its nodes. In some examples, the processing of each stimulus of the set of stimuli 228 results in the creation, maintenance, or utilization of dynamic security mechanisms that further result in one or more outcomes being generated (e.g., the outcome 232). Such outcomes are either handled internally by one or more modules in the overlay system 202 or communicated via the interface module 204 as an external outcome. In one embodiment, all stimuli and corresponding outcomes are recorded for auditing and post-processing purposes by, for example, an operations module (not shown) and/or an analytics module (not shown) of the overlay system 202.

The overlay management module 214 may include suitable logic, circuitry, interfaces, and/or code, executable by the circuitry, configured to manage all overlays within the overlay system 202. Operations performed by the overlay management module 214 include overlay storage management, overlay structure modeling, overlay logic creation and execution, and overlay loading and unloading (within the executable graph-based model 100). The overlay management module 214 is communicatively coupled (e.g., connected either directly or indirectly) to one or more other modules within the overlay system 202 to complete some or all of these operations. For example, overlays can be persisted in some form of physical storage using the storage management module 218 (as described in more detail below). As a further example, overlays can be compiled and preloaded into memory via the memory management module 216 for faster run-time execution.

The memory management module 216 may include suitable logic, circuitry, interfaces, and/or code, executable by the circuitry, configured to manage and optimize the memory usage of the overlay system 202. The memory management module 216 thus helps to improve the responsiveness and efficiency of the processing performed by one or more of the modules within the overlay system 202 by optimizing the memory handling performed by these modules. The memory management module 216 uses direct memory or some form of distributed memory management architecture (e.g., a local or remote caching solution). Additionally, or alternatively, the memory management module 216 deploys multiple different types of memory management architectures and solutions (e.g., reactive caching approaches such as lazy loading or a proactive approach such as write-through cache may be employed). These architectures and solutions are deployed in the form of a flat (single-tiered) cache or a multi-tiered caching architecture, where each layer of the caching architecture can be implemented using a different caching technology or architecture solution approach. In such implementations, each cache or caching tier can be configured (e.g., by the configuration 222) independently of the requirements for one or more modules of the overlay system 202. For example, data priority and an eviction strategy, such as least-frequently-used (LFU) or least-recently-used (LRU), can be configured for all or parts of the executable graph-based model 100. In one embodiment, the memory management module 216 is communicatively coupled (e.g., connected either directly or indirectly) to one or more overlays within the executable graph-based model 100.

The storage management module 218 may include suitable logic, circuitry, interfaces, and/or code, executable by the circuitry, configured to manage the temporary or permanent storage of data associated with messages being communicated within the overlay system 202. The storage management module 218 is any suitable low-level storage device solution (such as a file system) or any suitable high-level storage technology such as another database technology (e.g., relational database management system (RDBMS) or NoSQL database). The storage management module 218 is directly connected to the storage device upon which the relevant data is persistently stored. For example, the storage management module 218 can directly address the computer-readable medium (e.g., hard disk drive, external disk drive, or the like) upon which the data is being read or written. Alternatively, the storage management module 218 is connected to the storage device via a network such as the network 230. As will be described in more detail later in the present disclosure, the storage management module 218 uses 'manifests' to manage the interactions between the storage device and the modules within the overlay system 202. In one embodiment, the storage management module 218 is communicatively coupled (e.g., connected either directly or indirectly) to one or more overlays within the executable graph-based model 100.

As described, storage, loading, and unloading of the executable graph-based model 100 or one or more components thereof may be facilitated by the memory management module 216 and the storage management module 218. The memory management module 216 and the storage management module 218 may facilitate such operations by interacting with the storage device. In the present disclosure, the executable graph-based model 100 may be stored in a storage element. The storage element corresponds to a combination of the memory management module 216 and the storage management module 218. In some embodiments, the storage element may be a storage module that is managed by the memory management module 216 and the storage management module 218, collectively.

The security management module 220 may include suitable logic, circuitry, interfaces, and/or code, executable by the circuitry, configured to facilitate dynamic security for executable graph-based models in the overlay system 202. Security is hardware-related, network-related, or software-related, depending on the operational environment, the architecture of the deployment, or the data and information contained within the overlay system 202. For example, if the system is deployed with a web-accessible API (as described above in relation to the interface module 204), the security management module 220 can enforce a hypertext transfer protocol secure (HTTPS) protocol with the necessary certification. As a further example, if the data or information associated with the message received or processed by the overlay system 202 contains Personally Identifiable Information (PII) or Protected Health Information (PHI), the security management module 220 can implement one or more layers of data protection to ensure that the PII or PHI is correctly processed and stored. In an additional example, in implementations where the overlay system 202 operates on United States of America citizen medical data, the security management module 220 may enforce additional protections or policies as defined by the United States Health Insurance Portability and Accountability Act (HIPAA). Similarly, if the overlay system 202 is deployed in the European Union (EU), the security management module 220 may enforce additional protections or policies to ensure that the data processed and maintained by the overlay system 202 complies with the General Data Protection Regulation (GDPR).

Operations performed by security management module 220 include the generation, maintenance, and utilization of dynamic security mechanisms for executable graph-based models (such as the executable graph-based model 100). The security mechanisms are implemented at a node level. For example, the security management module 220 may be configured to create one or more security overlays for a node such that the security overlays control access to the corresponding node. The security level of such security overlays is a function of an information value of data stored in the corresponding node. Thus, the security management module 220 may be configured to determine an information value associated with each node and define the level of security accordingly. Additionally, if two or more nodes are associated (e.g., combined or linked) during stimulus processing such that an aggregated node defining the association between the two or more nodes is created, the security management module 220 may be configured to determine the information value of the aggregated node and dynamically associate security overlays of proportional security level to the aggregated node. The security management module 220 may be further configured to manage the security of node groups (e.g., logical grouping of nodes). The security management module 220 is communicatively coupled (e.g., connected either directly or indirectly) to one or more other modules within the overlay system 202 to complete some or all of these operations. The security management module 220 is further communicatively coupled (e.g., connected either directly or indirectly) to one or more nodes and/or one or more overlays within the executable graph-based model 100, thereby directly connecting security execution to the data/information in the executable graph-based model 100.

In addition to the abovementioned components, the overlay system 202 further includes the data management module 234. The data management module 234 may include suitable logic, circuitry, interfaces, and/or code, executable by the circuitry, configured to manage all data or information (e.g., the dataset 226) within the overlay system 202 for a given application. Operations performed by the data management module 234 include data loading, data unloading, data modeling, and data processing. The data management module 234 is communicatively coupled (e.g., connected either directly or indirectly) to one or more other modules within the overlay system 202 to complete some or all of these operations. For example, data storage is handled by the data management module 234 in conjunction with the storage management module 218.

The functionality of two or more of the modules included in the overlay system 202 may be combined within a single module. Conversely, the functionality of a single module can be split into two or more further modules which can be executed on two or more devices. The modules described above in relation to the overlay system 202 can operate in a parallel, distributed, or networked fashion. The overlay system 202 may be implemented in software, hardware, or a combination of both software and hardware. Examples of suitable hardware modules include a general-purpose processor, a field programmable gate array (FPGA), and/or an application-specific integrated circuit (ASIC). Software modules can be expressed in a variety of software languages such as C, C++, Java, Ruby, Visual Basic, Python, and/or other object-oriented, procedural, or programming languages.

Although it is described that the overlay system 202 includes a single executable graph-based model (e.g., the executable graph-based model 100), the scope of the present disclosure is not limited to it. In other embodiments, the overlay system 202 may include more than one executable graph-based model, without deviating from the scope of the present disclosure. In such a scenario, each executable graph-based model is implemented and managed in a manner that is similar to the executable graph-based model 100.

Having described the overlay system 202 for executing and managing executable graph-based models, the description will now turn to the elements of an executable graph-based model; specifically, the concept of a node. Unlike conventional graph-based systems, all elements (e.g., data, overlays, etc.) within the executable graph-based model (e.g., the executable graph-based model 100) are implemented as nodes. As will become clear, this allows executable graph-based models to be flexible, extensible, and highly configurable.

Figure 3A:
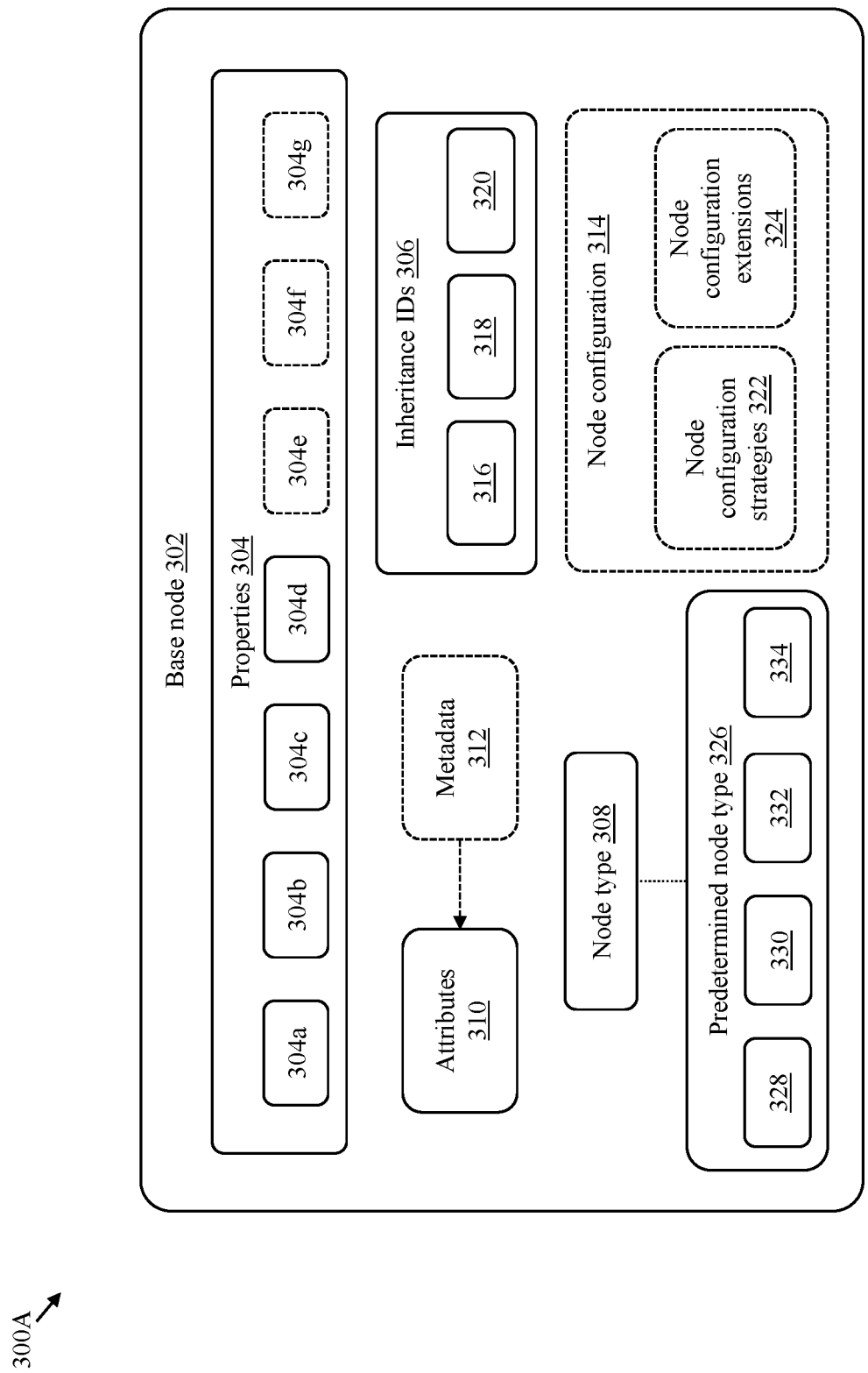
FIG. 3A is a block diagram that illustrates a generic structure of a base node within the executable graph-based model of FIG. 1, in accordance with an embodiment of the present disclosure.

FIG. 3A is a block diagram 300A that illustrates a generic structure of a base node 302 within the executable graph-based model 100, in accordance with an embodiment of the present disclosure. Referring to FIG. 3A, the base node 302 corresponds to the core structure of the executable graph-based model 100 and forms the foundational building block for all data and processing logic within the executable graph-based model 100. The base node 302 includes properties 304, inheritance identifiers (IDs) 306, and a node type 308. The base node 302 optionally includes one or more attributes 310, metadata 312 associated with the attributes 310, and a node configuration 314.

The properties 304 of the base node 302 include a unique ID 304a, a version ID 304b, a namespace 304c, and a name 304d. The properties 304 optionally include one or more icons 304e, one or more labels 304f, and one or more alternative IDs 304g. The inheritance IDs 306 of the base node 302 comprise an abstract flag 316, a leaf flag 318, and a root flag 320. The node configuration 314 optionally includes one or more node configuration strategies 322 and one or more node configuration extensions 324. FIG. 3A further shows a plurality of predetermined node types 326 which include a vertex node type 328, an edge node type 330, a role node type 332, and an overlay node type 334.

The unique ID 304a is unique for each node within the executable graph-based model 100. The unique ID 304a is used to register, manage, and reference the base node 302 within the system (e.g., the overlay system 202). In some embodiments, the one or more alternative IDs 304g are associated with the unique ID 304a to help manage communications and connections with external systems (e.g., during configuration, sending stimuli, or receiving outcomes). The version ID 304b of the base node 302 is incremented when the base node 302 undergoes transactional change. This allows the historical changes between versions of the base node 302 to be tracked by modules or overlays within the overlay system 202. The namespace 304c of the base node 302, along with the name 304d of the base node 302, is used to help organize nodes within the executable graph-based model 100. That is, the base node 302 is assigned a unique name 304d within the namespace 304c such that the name 304d of the base node 302 need not be unique within the entire executable graph-based model 100, only within the context of the namespace 304c to which the base node 302 is assigned. The base node 302 optionally includes one or more icons 304e which are used to provide a visual representation of the base node 302 when visualized via a user interface. The one or more icons 304e can include icons at different resolutions and display contexts such that the visualization of the base node 302 is adapted to different display settings and contexts. The base node 302 also optionally includes one or more labels 304f which are used to override the name 304d when the base node 302 is rendered or visualized.

The base node 302 supports the concept of inheritance of data and processing logic associated with any other node of the executable graph-based model 100 that is inherited by the base node 302. This allows the behavior and functionality of the base node 302 to be extended or derived from the inherited node of the executable graph-based model 100. The inheritance IDs 306 of the base node 302 indicates the inheritance-based information, which may be applicable to the base node 302. The inheritance IDs 306 comprise a set of Boolean flags that identify the inheritance structure of the base node 302.

The abstract flag 316 allows the base node 302 to support the construct of abstraction. When the abstract flag 316 takes a value of 'true', the base node 302 is flagged as abstract that is to say that it cannot be instantiated or created within an executable graph-based model (e.g., the executable graph-based model 100). Thus, in an instance when the base node 302 has the abstract flag 316 set to 'true', the base node 302 may only form the foundation of other nodes that inherit therefrom. By default, the abstract flag 316 of the base node 302 is set to 'false'. The leaf flag 318 is used to indicate whether any other node may inherit from the base node 302. If the leaf flag 318 is set to 'true', then no other node may inherit from the base node 302 (but unlike an abstract node, a node with the leaf flag 318 set to 'true' may be instantiated and created within the executable graph-based model 100). The root flag 320 is used to indicate whether the base node 302 inherits from any other node. If the root flag 320 is set to 'true', the base node 302 does not inherit from any other node. The base node 302 is flagged as leaf (e.g., the leaf flag 318 is set to 'true') and/or root (e.g., the root flag 320 is set to 'true'), or neither (e.g., both the leaf flag 318 and the root flag 320 are set to 'false'). It will be apparent to a person skilled in the art that a node cannot be flagged as both abstract and leaf (e.g., the abstract flag 316 cannot be set to 'true' whilst the leaf flag 318 is set to 'true').

As stated above, all elements of the executable graph-based model 100 are defined as nodes. This functionality is in part realized due to the use of a node type. The node type 308 of the base node 302 is used to extend the functionality of the base node 302. All nodes within the executable graph-based model 100 comprise a node type that defines additional data structures and implements additional executable functionality. A node type thus includes data structures and functionality that are common across all nodes that share that node type. The composition of a node with a node type therefore improves extensibility by allowing the generation of specialized node functionalities for specific application areas. Such extensibility is not present in prior art graph-based models. As illustrated in FIG. 3A, the base node 302 and the node type 308 are one logical unit that is not separated in the context of an executing system at run-time (e.g., in the context of execution of an executable graph-based model).

FIG. 3A further shows the plurality of predetermined node types 326 which provides a non-exhaustive list of node types that may be associated with a node, such as the base node 302. The vertex node type 328 (also referred to as a data node type or a value node type) includes common data structures and functionality related to the 'things' modeled in the graph (e.g., the data). The edge node type 330 includes common data structures and functionality related to joining two or more nodes. A node having the edge node type 330 may connect two or more nodes and thus the edge node type 330 constructs associations and connections between nodes (for example objects or 'things') within the executable graph-based model 100. The edge node type 330 is not restricted to the number of nodes that can be associated or connected by a node having the edge node type 330. The data structures and functionality of the edge node type 330 thus define a hyper-edge which allows two or more nodes to be connected through a defined set of roles. A role defines a connective relationship between the two or more nodes, and hence, allows an edge node to connect two or more nodes such that the two or more nodes may have more than one relationship therebetween. The role node type 332 defines a connective relationship between two nodes, for example, an edge node and a first vertex node. A node with the role node type 332 defines a relationship without expressly defining the first vertex node to which the edge node connects. A number of roles (and thus a number of connections) that an edge node type can have is not limited.

As will be described in more detail below, the overlay node type 334 is used to extend the functionality of a node, such as the base node 302, to incorporate processing logic. Unlike non-overlay nodes, an overlay node includes processing logic which determines the functionality of the overlay node. The processing logic of an overlay node includes a block of executable code, or instructions, which carries out one or more operations associated with the dynamic security management within the executable graph-based model 100. The block of executable code is pre-compiled code, code that requires interpretation at run time, or a combination of both. Different overlay nodes provide different processing logic to realize different functionality. For example, a security overlay node includes processing logic to control access to an edge node, a role node, a vertex node, and/or another overlay node.

The one or more attributes 310 correspond to the data associated with the base node 302 (e.g., the data represented by the base node 302 within the executable graph-based model 100 as handled by the data management module 234). Notably, a node in the executable graph-based model 100 that is not associated with data may not have any attributes. The one or more attributes 310 represent a complex data type. Each attribute of the one or more attributes 310 is composed of an attribute behavior. Attribute behavior may be a standard attribute behavior, a reference attribute behavior, a derived attribute behavior, or a complex attribute behavior. The attribute behavior of each attribute defines the behavior of the corresponding attribute. The attribute behavior of each attribute may be configured by associated attribute configurations. The attribute configurations are examples of attribute configuration extensions which are node configuration extensions (e.g., they are part of the one or more node configuration extensions 324 of the base node 302 shown in FIG. 3A). The standard attribute behavior may be configured by a standard attribute configuration, the reference attribute behavior may be configured by a reference attribute configuration, the derived attribute behavior is configured by a derived attribute configuration, and the complex attribute behavior is configured by a complex attribute configuration.

The standard attribute behavior is a behavior that allows read-write access to the data of the corresponding attribute. The reference attribute behavior is a behavior that allows read-write access to the data of the corresponding attribute but restricts possible values of the data to values defined by a reference data set. The reference attribute configuration associated with reference attribute behavior includes appropriate information to obtain a reference data set of possible values. The derived attribute behavior is a behavior that allows read-only access to data of the corresponding attribute. Also, data of the corresponding attribute is derived from other data, or information, within the executable graph-based model 100 in which an executable node of the corresponding attribute is used. The data is derived from one or more other attributes associated with the node or is derived from more complex expressions depending on the application area. In one embodiment, the derived attribute configuration (which is used to configure the derived attribute behavior) includes mathematical and/or other forms of expressions (e.g., regular expressions, templates, or the like) that are used to derive the data (value) of the corresponding attribute. The complex attribute behavior is a behavior that allows the corresponding attribute to act as either a standard attribute behavior if the data of the corresponding attribute is directly set, or a derived attribute behavior if the data of the corresponding attribute is not directly set.

As shown, the base node 302 further includes the metadata 312 (e.g., data stored as a name, a count of processed data records, time when the last data record was processed, an average processing time required for processing a data record, or the like) which is associated with either the base node 302 or an attribute (for example, the one or more attributes 310) of the base node 302.

An attribute within the one or more attributes 310 may either have an independent or shared state. An independent attribute has data that is not shared with any other node within the executable graph-based model 100. Conversely, a shared attribute has data that is shared with one or more other nodes within the executable graph-based model 100. For example, if two nodes within the executable graph-based model 100 both comprise a shared-data attribute with a value state shared by both nodes, then updating the data (e.g., the value) of this shared attribute will be reflected across both nodes.

The node configuration 314 provides a high degree of configurations for the different elements of the base node 302. The node configuration 314 optionally includes the one or more node configuration strategies 322 and/or the one or more node configuration extensions 324 which are complex data types. An example of a concrete node configuration strategy is an ID strategy, associated with the configuration of the unique ID 304*a* of the base node 302, which creates source IDs. A further example of a concrete node configuration strategy is a versioning strategy, associated with the configuration of the version ID 304b of the base node 302, which supports major and minor versioning (depending on the type of transactional change incurred by the base node 302). The versioning strategy may be adapted to a native filing system of a user device hosting the overlay system 202 or a third-party data storage (for example, Snowflake®, or the like) associated with the overlay system 202.

Figure 3B:
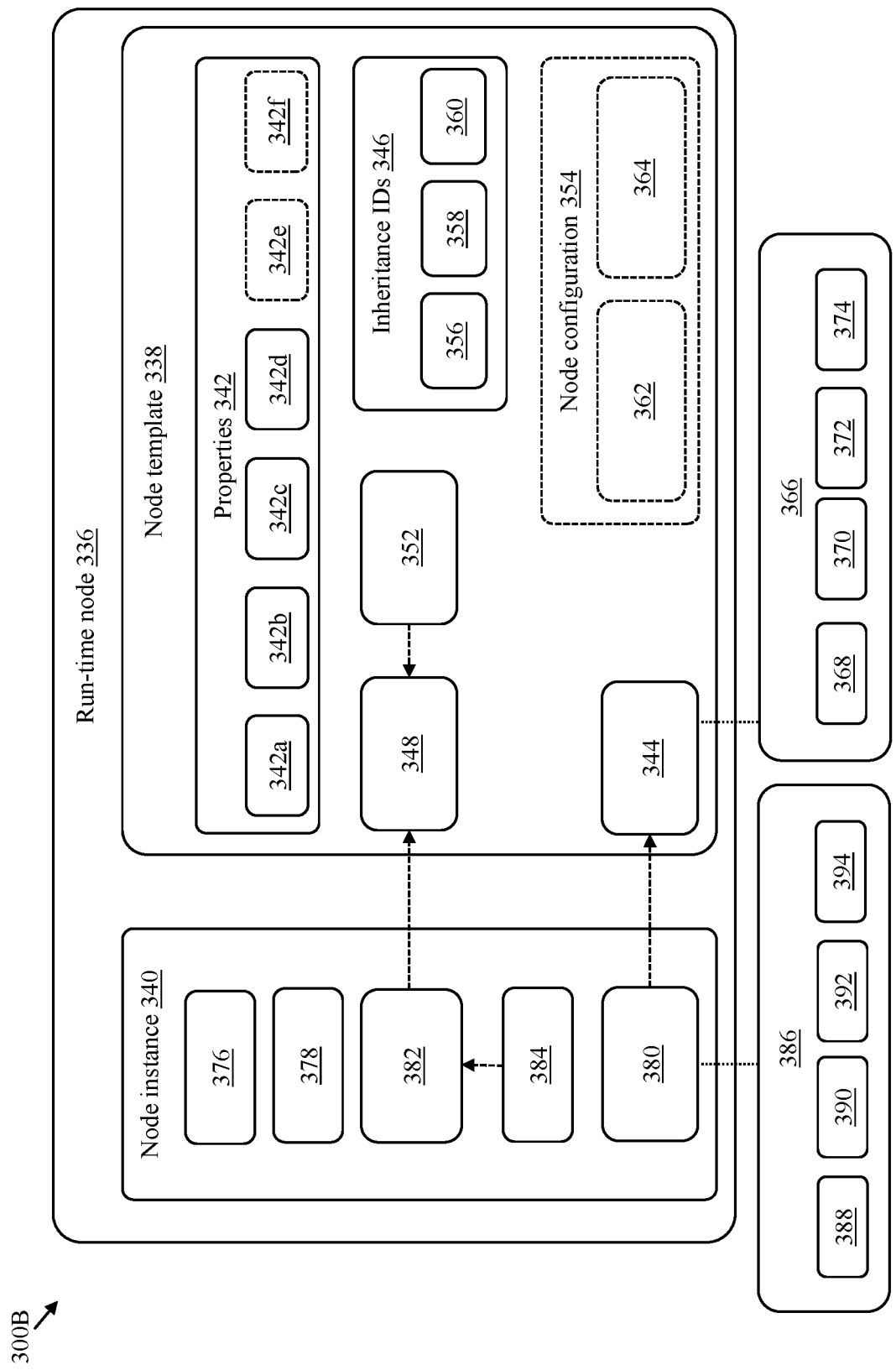
FIG. 3B is a block diagram that illustrates a generic structure of a run-time node within the executable graph-based model of FIG. 1, in accordance with an embodiment of the present disclosure.

FIG. 3B is a block diagram 300B that illustrates a generic structure of a run-time node 336 within the executable graph-based model 100, in accordance with an embodiment of the present disclosure. Referring to FIG. 3B, the run-time node 336 corresponds to the core structure of the executable graph-based model 100 and forms the foundational building block for all data and processing logic within the executable graph-based model 100. The run-time node 336 is shown to include a node template 338 and a node instance 340. The node instance 340 is generated according to the node template 338. The node template 338 forms a data structure for the node instance 340. The run-time node 336 shown in FIG. 3B is a compositional structure that is generated and executed, at run-time as part of the executable graph-based model 100. In other words, the node template 338 is defined 'offline' and the node instance 340 and the run-time node 336 are run-time structures that are dynamically generated during execution of the executable graph-based model 100.

The node template 338 comprises a predetermined node structure. Further, the node template 338 defines one or more rules that govern the generation of the node instance 340. The node instance 340 is an implementation of the node template 338. In other words, the node instance 340 is generated based on the predetermined node structure and the one or more rules of the node template 338. The node template 338 cannot be modified during the execution but may be modified during offline mode or at rest. During execution, only the node instance 340 of the run-time node 336 may be modified.

The node template 338 includes properties 342, a node type template 344, inheritance IDs 346, and a set of attribute templates 348. The node template 338 may optionally include metadata 352 and node configuration 354. The properties 342 of the node template 338 include a unique identifier (ID) 342a, a version ID 342b, a namespace 342c, a name 342d, and optionally include one or more icons 342e and a set of labels 342f. The inheritance IDs 346 comprise an abstract flag 356, a leaf flag 358, and a root flag 360. The node configuration 354 optionally comprises one or more node configuration strategies 362 and/or one or more node configuration extensions 364. FIG. 3B further shows a plurality of predetermined node type templates 366. The plurality of predetermined node type templates 366 include a vertex node type template 368, an edge node type template 370, a role node type template 372, and an overlay node type template 374. Further, the node instance 340 includes a unique ID 376, a version ID 378, a node type instance 380, and a set of attribute instances 382. The node instance 340 may optionally include metadata 384. FIG. 3B further shows a plurality of predetermined node type instances 386. The plurality of predetermined node type instances 386 include a vertex node type instance 388, an edge node type instance 390, a role node type instance 392, and an overlay node type instance 394.

The unique ID 342a is unique for each node template within the executable graph-based model 100. Similarly, the unique ID 374 is unique for each node instance within the executable graph-based model 100. The unique ID 342a and the unique ID 374 are used to register, manage, and reference the node template 338 and the node instance 340, respectively, within the overlay system 202. The version ID 342b of the node template 338 is incremented when the node template 338 undergoes transactional change. Similarly, the version ID 376 of the node instance 340 is incremented when the node instance 340 undergoes transactional change. The namespace 342c of the node template 338, along with the name 308d of the node template 338, is used to help organize node templates within the executable graph-based model 100. That is, the node template 338 is assigned a unique name 342d within the namespace 342c such that the name 342d of the node template 338 need not be unique within the entire executable graph-based model 100, only within the context of the namespace 342c to which the node template 338 is assigned. The node template 338 optionally comprises one or more icons 342e which are used to provide a visual representation of the node template 338. The one or more icons 342e can include icons at different resolutions and display contexts such that the visualization of the node is adapted to different display settings and contexts. The node template 338 also optionally comprises the set of labels 342f which are used to override the name 342d when the node template 338 is rendered or visualized.

The node template 338 supports the software development feature of multiple inheritance by maintaining references (not shown) to zero or more other node templates, which then act as the base of the node template 338. This allows the behavior and functionality of a node template to be extended or derived from one or more other node templates within an executable graph-based model. The node instance 340 likewise supports multiple inheritance because it is an instance representation of the node template 338. The multiple inheritance structure of the node instance 340 is, however, limited to the corresponding instance realization of the multiple inheritance structure defined by the node template 338, i.e., one node instance 340 is created and managed for each node template 338 defined in the inheritance hierarchy for a node instance of a node template.

The inheritance IDs 346 of the node template 338 provide an indication of the inheritance-based information, which is applicable, or can be applicable, to the node template 338. The inheritance IDs 346 has a description that is similar to the inheritance IDs 306. The abstract flag 356 has a description that is similar to the abstract flag 316, the leaf flag 358 has a description that is similar to the leaf flag 318 and the root flag 360 has a description that is similar to the root flag 320.

All elements within the executable graph-based model 100 are defined as node templates or node instances. The functionality of the node template 338 and the node instance 340 are realized due to the use of the node type template 344 and the node type instance 380. The node type template 344 of the node template 338 is used to extend the functionality of the node template 338 by defining the standard set of capabilities, including data and associated behavior. The vertex node type template 368 (also referred to as a data node type) includes a template of common data structures and functionality related to the 'things' modeled in the graph (e.g., the data). The vertex node type instance 388 includes the common data structures and functionality related to the 'things' modeled in the graph based on the vertex node type template 368. The edge node type template 370 includes a template of common data structures and functionality related to joining two or more nodes. A node instance having the edge node type instance 390 may connect two or more nodes and thus the edge node type instance 390 constructs associations and connections between nodes (for example objects or 'things') within the executable graph-based model 100. The edge node type instance 390 is not restricted to the number of nodes that can be associated or connected by a node having the edge node type instance 390. The data structures and functionality of the edge node type instance 390 thus define a hyper-edge which allows two or more nodes to be connected through a defined set of roles. The role node type template 372 includes a template that defines a connective relationship between the two or more nodes, and hence, allows an edge node to connect two or more nodes such that the two or more nodes may have more than one relationship therebetween. The role node type instance 392 defines a connective relationship between two nodes, for example, an edge node and a first vertex node. A node with the role node type instance 392 defines a relationship without expressly defining the first vertex node to which the edge node connects. A number of roles (and thus a number of connections) that an edge node type can have is not limited.

The plurality of predetermined node type templates 366 further includes the overlay node type template 374. The overlay node type template 374 is used to extend the functionality of a node template (e.g., the node template 338) to incorporate processing logic. Similarly, the overlay node type instance 394 is used to extend the functionality of a node instance (e.g., the node instance 340) to incorporate processing logic.

The set of attribute templates 348 corresponds to the data defined by the node template 338. For example, the set of attribute templates 348 may define the names and value types (e.g., integer, string, float, etc.) of one or more attributes but not the values of these attributes. The values of the set of attribute templates 348 may be defined by the set of attribute instances 382 of the node instance 340 through one or more values or instance values. For example, the node template 338 may define a string attribute 'surname' and the corresponding node instance 340 may assign the instance value 'Bell-Richards' to this string attribute. Each attribute instance of the set of attribute instances 382 is associated with an attribute template of the set of attribute templates 348. The node template 338 may define one or more default values for the set of attribute templates 348. The default values correspond to the values that the attributes take if no value is assigned. The metadata 352 (e.g., data stored as a name, value type, and value triplet) is associated with either the node template 338 or one or more of the set of attribute templates 348 of the node template 338. Similarly, the node instance 340 also optionally comprises the metadata 352 (e.g., data stored as a name, value type, and value triplet) which is associated with either the node instance 340 or one or more of the set of attribute instances 382.

The node configuration 354 provides a high degree of configurability for the different elements of a node template and/or node instance. An example of a concrete node configuration strategy is an ID strategy, associated with the configuration of the unique ID 342a of the node template 338. A further example of a concrete node configuration strategy is a versioning strategy, associated with the configuration of the version ID 342b of the node template 338 which supports major and minor versioning (depending on the type of transactional change incurred). The versioning strategy may be adapted to a native filing system of a user device hosting the overlay system 202 or a third-party data storage (for example, Snowflake®, or the like) associated with the overlay system 202.

Although it is provided that the node template 338 is associated with the node instance 340, the scope of the present disclosure is not limited to it. In other embodiments, the node template 338 may be further associated with two or more node instances where the two or more node instances correspond to two or more implementations of the node template 338.

Figure 4:
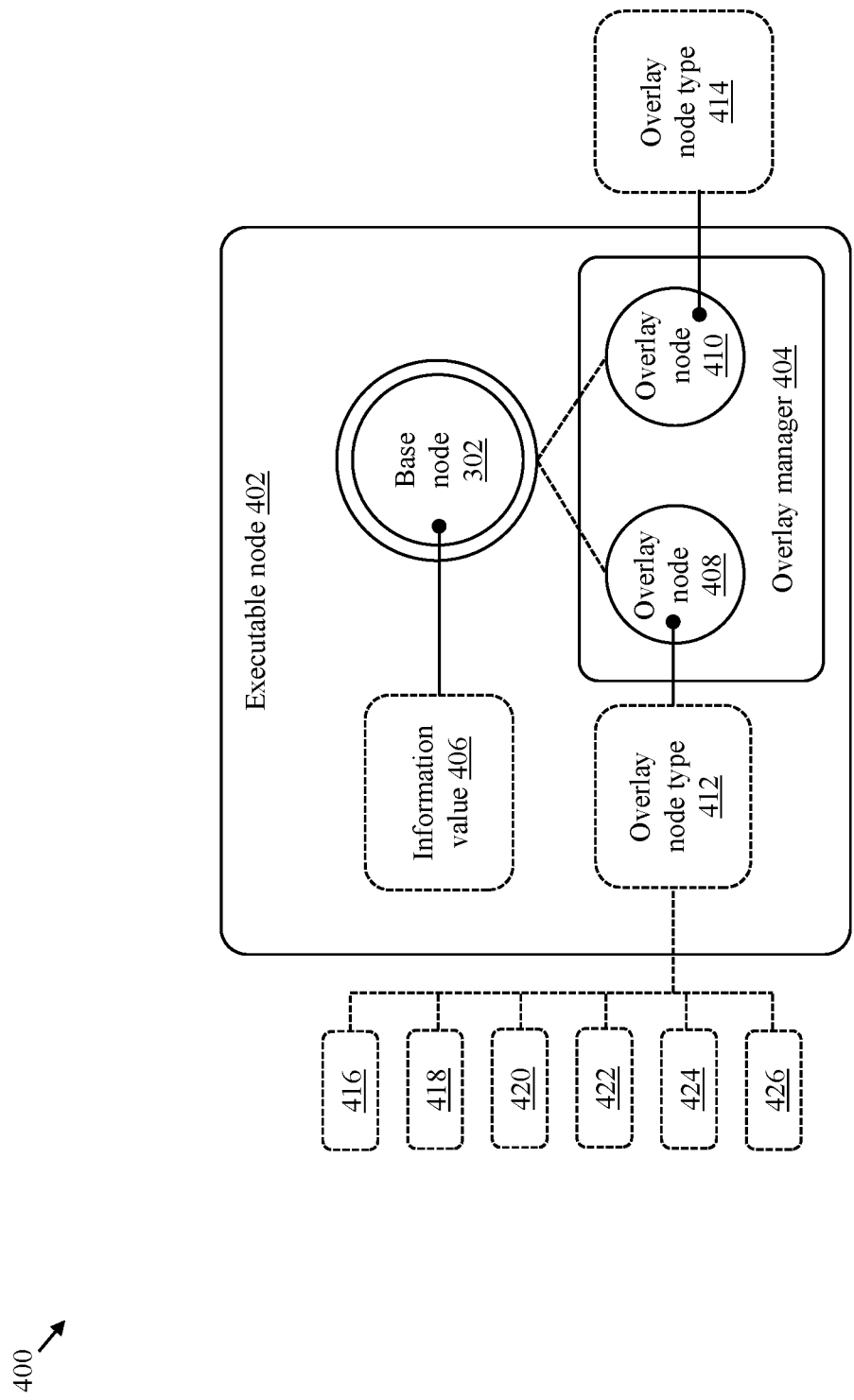
FIG. 4 is a block diagram that illustrates an executable node within the executable graph-based model of FIG. 1, in accordance with an embodiment of the present disclosure.

FIG. 4 is a block diagram 400 that illustrates an executable node 402 within the executable graph-based model 100, in accordance with an embodiment of the present disclosure. Referring to FIG. 4, the executable node 402 is shown to include a node (e.g., the base node 302 or the run-time node 336) and an overlay manager 404. For the sake of ongoing discussion, the node corresponds to the base node 302, and is hereinafter referred to as the "base node 302". However, the functionality of the executable node 402 for the node corresponding to the run time node 336 may be similar to that for the node corresponding to the base node 302.

The base node 302 comprises an information value 406. The information value 406 corresponds to a data value as well as a hint associated with the data value. The hint provides contextual information associated with the data value. In other words, the information value 406 corresponds to contextualized data stored in the base node 302. The overlay manager 404 includes an overlay node 408 and an overlay node 410.

The base node 302 can be extended by one or more overlay nodes, e.g., the overlay node 408 and the overlay node 410. The executable node 402 provides processing functionality (e.g., processing logic) to the base node 302 via one or more associated overlay nodes (for example, the overlay nodes 408 and 410). Beneficially, the data and processing capability of the base node 302 may be dynamically and significantly extended using the concept of an executable node (for example, the executable node 402). As shown, the overlay node 408 has an overlay node type 412, and the overlay node 410 has an overlay node type 414. In an embodiment, the overlay node type 412 corresponds to a security overlay node type, whereas the overlay node type 414 corresponds to a non-security overlay node type.

A security overlay node (e.g., a node having the security overlay node type) is configured to control access to the node that it extends. A level of security provided by the security overlay node may be a function of a number of security bits, security algorithms, encryption keys, or the like, used for implementing the security mechanism. Examples of the overlay node type 412 include a role overlay node type 416, a user overlay node type 418, an access overlay node type 420, a policy overlay node type 422, an encryption overlay node type 424, and an obfuscation overlay node type 426. The overlay node type 412 is not limited to the afore-mentioned list, and in other embodiments, may include other overlay node types that perform access control operations.

A role overlay node (e.g., a node having the role overlay node type 416) defines a list of roles that have permission to access the corresponding node, e.g., the base node 302. A user overlay node (e.g., a node having the user overlay node type 418) defines a list of users that have permission to access the corresponding node, e.g., the base node 302. The list of users may be associated with a role of the list of roles. For example, 'Doctor' may correspond to a 'role', whereas, 'Smith' and 'John' may correspond to two users associated with the role 'Doctor'. Further, in some scenarios, all users with the role 'Doctor' may have permission to access the base node 302, whereas, in some other scenarios, only specific users (e.g., 'Smith') with the role 'Doctor' may have permission to access the base node 302.

An access overlay node (e.g., a node having the access overlay node type 420) defines one or more user access privileges for the corresponding node, e.g., the base node 302. The user access privileges may correspond to a creation privilege, a retrieval privilege, a deletion privilege, an update privilege, or the like. In other words, based on the user access privileges, a data record may be created in the base node 302, the data record stored in the base node 302 may be retrieved, updated, or deleted, or a combination thereof. A policy overlay node (e.g., a node having the policy overlay node type 422) defines one or more rules that govern access to the corresponding node, e.g., the base node 302. Examples of the policies (e.g., rules) may include a read-only policy, a read-write policy, a no-copy policy, a no-print policy, or the like. The read-only policy defines that the data record stored in the base node 302 may be read/used but cannot be modified. The read-write policy defines that the data record stored in the base node 302 may be read/used as well as modified. The no-copy policy defines that the data record stored in the base node 302 cannot be copied. The no-print policy defines that the data record stored in the base node 302 cannot be printed.

An encryption overlay node (e.g., a node having the encryption overlay node type 424) encodes data of the node it extends. An obfuscation overlay node (e.g., a node having the obfuscation overlay node type 426) creates an obfuscated version of the data of the node it extends. The encryption and obfuscation overlay nodes can be overlays of the base node 302 (e.g., the data record stored in the base node 302 is encrypted or obfuscated) or other security overlay nodes (e.g., the list of users, the list of roles, the one or more user access privileges, and/or the one or more rules are encrypted or obfuscated).

Thus, the encryption and obfuscation overlay nodes act on the data of the node that they extend, whereas, the role, user, access, and policy overlay nodes act as gate keepers determining whether access can be granted to the data of the node that they extend.

Although, the executable node 402 is shown to include only one security overlay node (e.g., the overlay node 408), in other embodiments, the executable node 402 may include any number of security overlay nodes, without deviating from the scope of the present disclosure. In such a scenario, one or more security overlay nodes may operate in conjunction to provide increased security to the base node 302. For example, the base node 302 may be extended by a role overlay node, an encryption overlay node, a policy overlay node, and an access overlay node. Additionally, the role overlay node may be further extended by a user overlay node. The aforementioned security overlay nodes may have predefined execution priority. The predefined execution priority is defined by the overlay manager 404 by way of the configuration 222. That is to say, the overlay manager 404 defines the sequence in which the security overlay nodes are to be executed.

In an example, the overlay system 202 may be implemented in an organization for maintaining employee records, with the base node 302 storing one such employee record. In such a scenario, the role overlay node may define that a role 'Management' has access to the base node 302, whereas, the user overlay node may define that a user 'Steve' has access to the base node 302. As the user overlay node extends the role overlay node, both overlay nodes may be executed one after the other. The order of execution may be defined based on a depth-first (e.g., the user overlay node being executed first) or a breadth-first (e.g., the role overlay node being executed first). The execution of the role and user overlay nodes may result in a user named 'Steve' who is part of 'Management' being allowed access to the data record stored in the base node 302. Further, the encryption overlay node may encrypt the base node 302, and the base node 302 may be decrypted prior to allowing 'Steve' who is part of 'Management' access to the data record stored in the base node 302. The policy overlay node may define that access to the base node 302 can be a read-only access, with the access overlay node defining that the access privilege associated with the base node 302 is a retrieval privilege. Thus, 'Steve' who is part of 'Management' may be allowed to access the data record stored in the base node 302 only to retrieve the data record but is prohibited from modifying the data record.

Various combinations of the above-mentioned security overlay nodes may be defined for a base node (e.g., the base node 302) to provide security thereto. Each combination may have a security level associated therewith. The security level provided by each combination (e.g., each set) of security overlay nodes is a function of the information value (e.g., the information value 406) of the corresponding node. The dynamic implementation of the security overlay nodes based on the information value of the node provides a secured way of storing and managing data in the executable graph-based model 100.

A non-security overlay node (e.g., a node having the non-security overlay node type) may be any other overlay node executing non-security operations (e.g., operations that are different from access control operations) for the node that it extends. Examples of the non-security overlay node type include a message handler overlay node type, a message publisher overlay node type, an audit overlay node type, a history overlay node type, an analytics overlay node type, a location overlay node type, a data quality overlay node type, or the like. For the sake of simplicity, examples of the non-security overlay node type (e.g., the overlay node type 414) are not shown in FIG. 4.

A message handler overlay node (e.g., a node having the message handler overlay node type) is a node that includes processing logic for subscribing to one or more messages mapped to the corresponding executable node and processing the subscribed messages in conjunction with the corresponding executable node. The term 'subscribe' refers to an operation that is executed by a message handler overlay node for receiving a message. A message publisher overlay node (e.g., a node having the message publisher overlay node type) is a node that includes processing logic for the generation and publication of one or more messages to be communicated by the corresponding executable node. The message publisher overlay node may be an extension of a base node or another overlay node (e.g., the message handler overlay node), and may generate and publish messages that are to be communicated by the corresponding base node or overlay node. An audit overlay node (e.g., a node having the audit overlay node type) is a node that includes processing logic for maintaining a record of any changes to a corresponding executable node. The audit overlay node may be an extension of a base node. A history overlay node (e.g., a node having the history overlay node type) is a node that includes processing logic for facilitating the creation, maintenance, and utilization of history associated with the corresponding executable node. A location overlay node (e.g., a node having the location overlay node type) is a node that includes processing logic for holding a storage location information where the corresponding executable node is to be persisted. A data quality overlay node (e.g., a node having the data quality overlay node type) is a node that includes processing logic for determining the quality value of data/information stored in the corresponding executable node. An analytics overlay node (e.g., a node having the analytics overlay node type) is a node that includes processing logic for analyzing data (e.g., messages) being communicated within the overlay system 202.

Although, the executable node 402 is shown to include only one non-security overlay node (e.g., the overlay node 410), in other embodiments, the executable node 402 may include any number of non-security overlay nodes, without deviating from the scope of the present disclosure.

Each overlay node, being a node, adheres to the generic structure of a base node described in conjunction with FIG. 3A or 3B.

In the present disclosure, "overlay" and "overlay node" are used interchangeably.

The executable node 402 extends the base node 302 (or is a subtype of the base node 302) such that all the functionality and properties of the base node 302 are accessible to the executable node 402. The executable node 402 also dynamically extends the functionality of the base node 302 by associating the overlay nodes maintained by the overlay manager 404 with the base node 302. The executable node 402 may thus be considered a composition of the base node 302 and the overlay nodes 408 and 410. The executable node 402 may be alternatively referred to as a node with overlay. Therefore, the executable node 402 acts as a decorator of the base node 302 adding the functionality of the overlay manager 404 to the base node 302.

It will be apparent to a person skilled in the art that the base node 302 refers to any suitable node within the executable graph-based model 100. As such, the base node 302 may be a node having a type such as a vertex node type, an edge node type, or the like. Alternatively, the base node 302 may itself be an executable node such that the functionality of the (executable) base node 302 is dynamically extended. In this way, complex and powerful processing functionality can be dynamically generated by associating and extending overlay nodes.

The overlay manager 404 registers and maintains one or more overlay nodes (such as the overlay node 408 and the overlay node 410) associated with the base node 302. The assignment of the overlay node 408 to the base node 302 (via the overlay manager 404) endows the base node 302 with processing logic and executable functionality defined within the overlay node 408. The overlay manager 404 of the executable node 402 is responsible for executing all overlays registered therewith. The overlay manager 404 also coordinates the execution of all associated overlay nodes. As shown in FIG. 4, the executable node 402 associates the base node 302 with two overlay nodes. Thus, the overlay manager 404 employs a strategy to manage the potentially cascading execution flow. Example strategies to manage the cascading execution of overlays include the visitor pattern and the pipe and filter pattern. Further examples include strategies that apply either breadth-first or depth-first processing patterns, a prioritization strategy, or a combination thereof. All execution strategies are defined and registered with the overlay manager 404 and are associated with an overlay via a node configuration extension for the overlay.

Extending the functionality of a node through one or more overlay nodes is at the heart of the overlay system 202. As illustrated in FIG. 3, the node and the functionality that acts upon that data (e.g., an overlay node) can be separated and independently maintained offline, but at run-time, an association between the node and the overlay node is determined and an executable node is generated (e.g., the executable node 402 shown in FIG. 4).

Because an overlay node is itself a base node, all functionality of a base node described in relation to the base node 302 is thus applicable to an overlay node. For example, an overlay node includes a unique ID, a name, etc., can have attributes (e.g., an overlay node can have its data defined), supports multiple inheritance, and can be configured via node configurations. Furthermore, because an overlay node is a node, the overlay node can have one or more overlay nodes associated therewith (not shown). Moreover, the processing functionality of an overlay node extends to the node type of the node to which the overlay node is applied.

An overlay node, such as the overlay nodes 408 and 410, is not bound to a single executable node or a single executable graph-based model (unlike nodes that have non-overlay node types). This allows overlay nodes to be centrally managed and reused across multiple instances of executable graph-based models. Notably, a node (for example, a base node, an executable node, and an overlay node) may be extended by way of overlays. Further, each overlay node may be extended to have one or more overlays. Such overlays may be termed chaining overlays. Also, a single overlay node may be associated with multiple executable nodes. Thus, the overlay node and functionality thereof may be shared among the multiple executable nodes.

The data and the processing logic associated with one or more overlays of an executable node (for example, the executable node 402) are persistent. The persistent nature of the data and the processing logic are described in detail in conjunction with FIG. 5.

Figure 5:
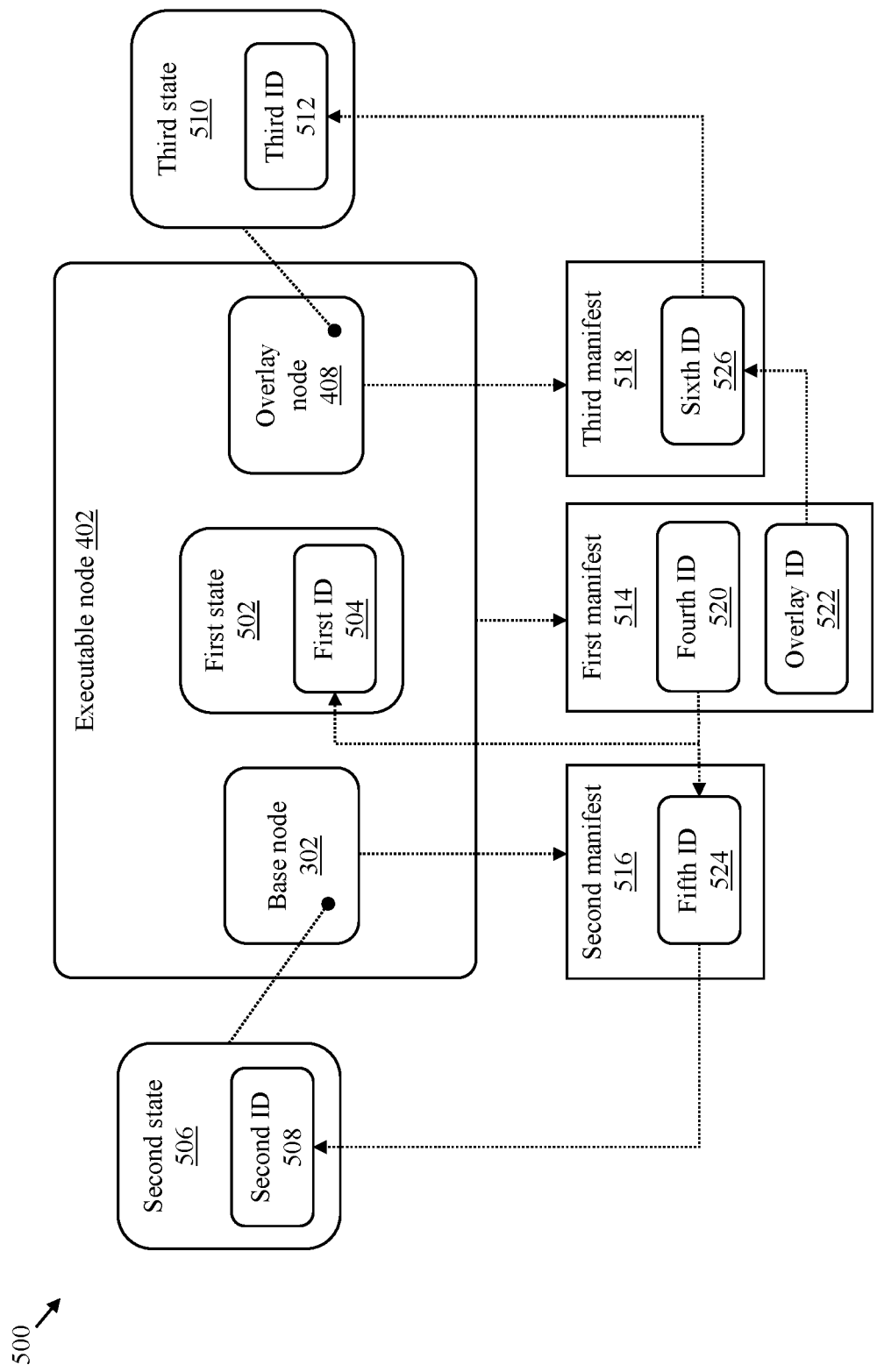
FIG. 5 is a block diagram that illustrates a composition of the executable node that enables persistent storage of data and the processing logic associated therewith, in accordance with an embodiment of the present disclosure.

FIG. 5 is a block diagram 500 that illustrates a composition of the executable node 402 that enables persistent storage of data and the processing logic associated therewith, in accordance with an embodiment of the present disclosure.

As described in conjunction with FIG. 4, the executable node 402 includes the base node 302 and one or more overlay nodes (e.g., the overlay nodes 408 and 410). For the brevity of the ongoing description, the persistent storage is explained for the executable node 402 including only the overlay node 408. One or more operations performed for ensuring the persistence of the overlay node 408 may be performed for the overlay node 410 as well.

Referring to FIG. 5, the executable node 402 includes the base node 302 and the overlay node 408. The executable node 402 has a first state 502 having a first ID 504. The base node 302 has a second state 506 having a second ID 508, and the overlay node 408 has a third state 510 having a third ID 512. A manifest (for example, first through third manifests 514-518) is generated for each of the base node 302, the executable node 402, and the overlay node 408. In an embodiment, the manifests may be generated by the storage management module 218. The first manifest 514 is associated with the executable node 402 and has a fourth ID 520 and an overlay ID 522. The second manifest 516 is associated with the base node 302 and has a fifth ID 524. The third manifest 518 is associated with the overlay node 408 and has a sixth ID 526. Further, the manifests are stored at respective storage locations that may be centralized or distributed storage locations associated with the overlay system 202. The manifests may be stored by the storage management module 218.

The first state 502 of the executable node 402 includes data required to reconstruct the executable node 402 (e.g., attributes, properties, etc.). The first state 502 of the executable node 402 is persistently stored along with the first ID 504. The first manifest 514 is generated for the executable node 402 and has (i) the fourth ID 520, (ii) the storage location of the first state 502 of the executable node 402, and (iii) the overlay ID 522. Notably, the fourth ID 520 is the same as the first ID 504 and the fifth ID 524, hence, the first manifest 514 includes the ID of the state of the base node 302 and the executable node 402. Further, the overlay ID 522 is the same as the sixth ID 526 of the state of the overlay node 408. Therefore, the first manifest 514 may be used to identify and retrieve the states of the base node 302, the executable node 402, and the overlay node 408. Subsequently, the retrieved states may be used to reconstruct the executable node 402 and the overlay node 408. In an instance, the executable node 402 may be further extended to include additional overlay nodes. In such an instance, the first manifest 514 may include state IDs of the additional overlay nodes as well. A first manifest state (not shown) is then generated for the first manifest 514 and persistently stored along with the fourth ID 520.

The second state 506 of the base node 302 includes data required to reconstruct the base node 302 (e.g., attributes, properties, etc.) and is persistently stored along with the second ID 508. The second manifest 516 is generated for the base node 302 and has (i) the fifth ID 524 and (ii) the storage location of the second state 506 of the base node 302. The second ID 508 of the second state 506 and the fifth ID 524 of the second manifest 516 are the same as the first ID 504 of the first state 502 of the executable node 402 (which is also the same as the fourth ID 520 of the first manifest 514 of the executable node 402). As mentioned above, along with the first state 502, the first manifest 514 may also be used to identify and retrieve the second manifest 516 which in turn may be used to identify the second state 506 of the base node 302. A second manifest state (not shown) is then generated for the second manifest 516 and persistently stored along with the fifth ID 524. Thus, the states, manifests, and manifest states for the executable node 402 and the base node 302 include the same, shared, ID. A shared ID can be used in this instance because the states, manifests, and manifest states are stored separately. The separate storage of the states, manifests, and manifest states exhibit a distributed architecture of the overlay system 202.

The third state 510 of the overlay node 408 includes data required to reconstruct the overlay node 408 (e.g., attributes, properties, processing logic, etc.) and is persistently stored along with the third ID 512. The third manifest 518 is generated for the overlay node 408 and includes the sixth ID 526, which is the same as the third ID 512. Therefore, the first manifest 514 may be further used to identify and retrieve the third manifest 518 which in turn may be used to identify and retrieve the third state 510 of the overlay node 408. A third manifest state (not shown) is then generated for the third manifest 518 and is persistently stored along with the sixth ID 526.

In operation, when the executable node 402 is to be loaded, the transaction module 208, in conjunction with the storage management module 218, may execute one or more operations to retrieve the first manifest state stored at a known storage location. Based on the first manifest state, the storage management module 218 may re-construct the first manifest 514 which includes the fourth ID 520 which is the same as the fifth ID 524 of the second manifest 516. Based on the fifth ID 524, the storage management module 218 may identify the second manifest state and may generate the second manifest 516 based on which the second state 506 is identified. Subsequently, the base node 302 is loaded and the storage management module 218 may determine that the base node 302 is a node with overlay. Based on the fourth ID 520 (that is the same as the first ID 504 of the first state 502 of the executable node 402) of the first manifest 514, the first state 502 is identified and retrieved. Subsequently, the executable node 402 is loaded. Moreover, based on the overlay ID 522 (that is the same as the sixth ID 526 of the third manifest 518) of the first manifest 514, the third manifest state is identified and the third manifest 518 is generated. Subsequently, based on the sixth ID 526 (that is the same as the third ID of the third state) of the third manifest 518, the third state 510 is identified and retrieved. Based on the third state 510, the overlay node 408 is reconstructed and loaded in the executable graph-based model 100.

In some embodiments, the overlay node 408 may not be loaded in case it is not required for executing the operation associated with the set of stimuli 228. The loaded executable node 402 and the overlay node 408 may be unloaded in case they remain unused for a first predefined time period, whereas one or more executable nodes that are used at least once during the predefined time period may be permanently loaded in the executable graph-based model 100. In some embodiments, the data and processing logic associated with a loaded executable node and/or overlay node may be transferred to a local memory of the overlay system 202 if the data and the processing logic remain unused for a second predefined time period. Further, the data and the processing logic associated with the executable node/overlay node are transferred to an external storage from the local memory in case the executable node/overlay node remains unused for a third predefined time period. The third predefined time period is greater than the second predefined time period. The term unloading refers to storing a state of a node with a current version of data and processing logic associated therewith at a storage location that is pointed by the corresponding manifest.

An executable graph-based model (for example, the executable graph-based model 100) may be stored (and loaded) using the above-described composition. Beneficially, each component is stored separately thereby allowing a user to maintain and store their data independently of the storage of the structure and functionality of the executable graph-based model 100.

Notably, all manifest states are stored together at a storage location that is known to the storage management module 218. Such centralized storage of the manifest states ensures that node states associated therewith are easily accessible.

It will be apparent to a person skilled in the art that although FIG. 5 illustrates only a single overlay node, in other embodiments, the executable node may include additional or different overlay nodes (e.g., the overlay node 410). It will also be apparent to a person skilled in the art that only those overlay nodes that are required for responding to a stimulus may be loaded. The overlay system 202 described above may be used to implement systems and methods for dynamic security for executable graph-based models in the overlay system 202.

Figure 6:
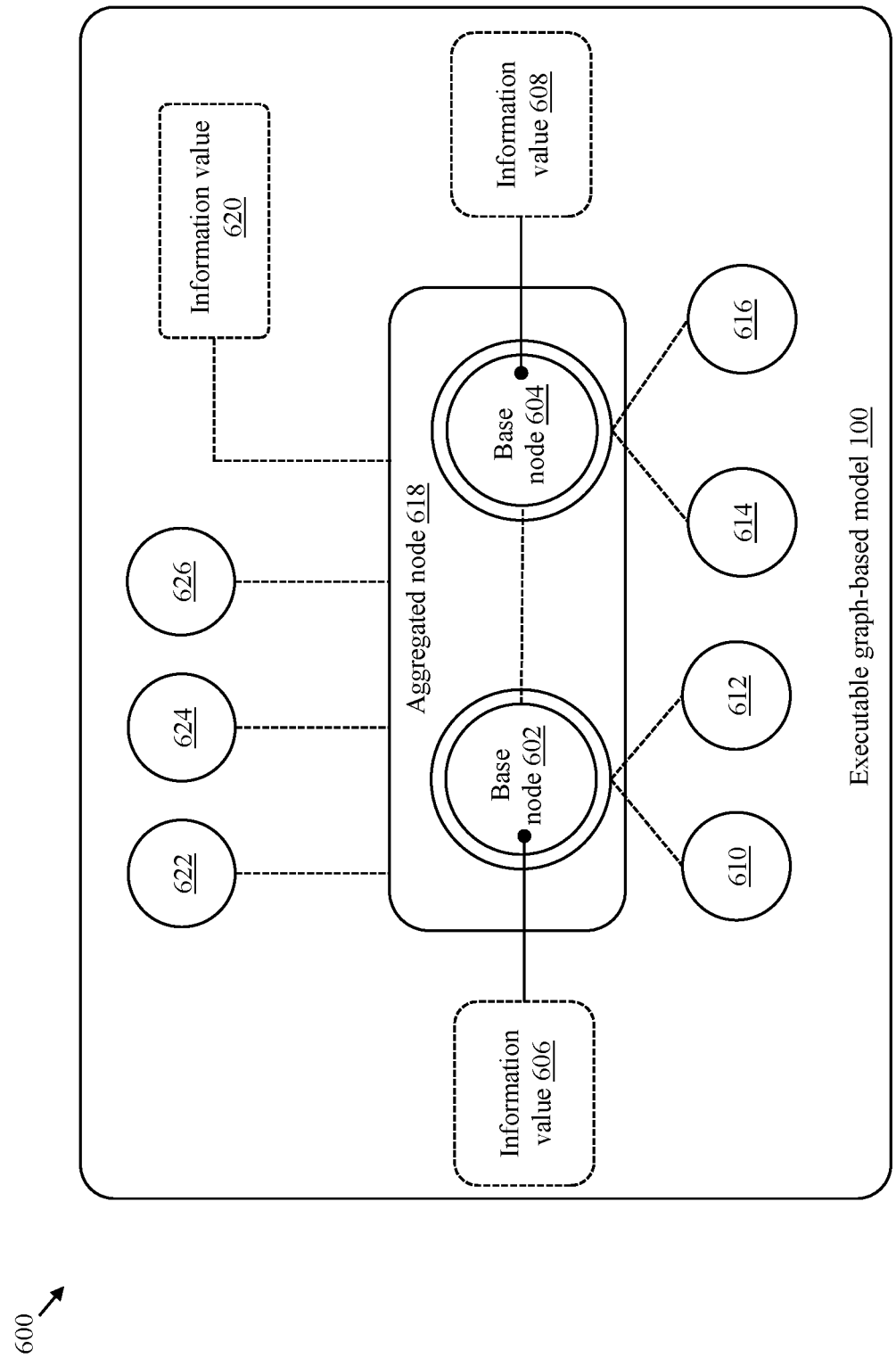
FIG. 6 is a schematic diagram that illustrates facilitation of dynamic security for the executable graph-based model of FIG. 1, in accordance with an embodiment of the present disclosure.

FIG. 6 is a schematic diagram 600 that illustrates facilitation of dynamic security for the executable graph-based model 100, in accordance with an embodiment of the present disclosure.

Referring to FIG. 6, the executable graph-based model 100 includes a base node 602 and a base node 604. The base nodes 602 and 604 structurally and functionally adhere to the base node 302. The base nodes 602 and 604 store information values 606 and 608, respectively. FIG. 6 further illustrates that each of the base nodes 602 and 604 is extended by way of overlay nodes, more specifically, security overlay nodes that are configured to control access to the corresponding base node. For example, the base node 602 is extended by way of a security overlay node 610 and a security overlay node 612 (collectively referred to as a "first set of security overlay nodes 610 and 612"), whereas the base node 604 is extended by way of a security overlay node 614 and a security overlay node 616 (collectively referred to as a "second set of security overlay nodes 614 and 616"). Thus, the executable graph-based model 100 includes a plurality of base nodes (e.g., the base nodes 602 and 604) and a plurality of security overlay nodes (e.g., the security overlay nodes 610-616), where each base node is associated with a set of security overlay nodes that is configured to control access to the corresponding base node.

Although not shown in FIG. 6, each of the base nodes 602 and 604 may additionally be associated with non-security overlay nodes.

An overlay node type of the security overlay nodes 610 and 612 may be one of the same and different. Similarly, an overlay node type of the security overlay nodes 614 and 616 may be one of the same and different. For the sake of ongoing discussion, it is assumed that the security overlay nodes 610 and 612 correspond to user and role overlay nodes, respectively, whereas the security overlay nodes 614 and 616 correspond to policy and obfuscation overlay nodes, respectively. The user and role overlay nodes have a first security level associated therewith, whereas the policy and obfuscation overlay nodes have a second security level associated therewith. The first and second security levels are functions of the information values 606 and 608, respectively. For example, the higher the information values 606 and 608, the higher the first and second security levels, respectively. In an embodiment, the first security level may be equal to the second security level. In another embodiment, the first security level may be less than the second security level. In yet another embodiment, the first security level may be greater than the second security level.

The stimuli management module 212 may be configured to receive a first stimulus of the set of stimuli 228, via the network 230. The first stimulus is associated with the overlay system 202 and corresponds to a command. Further, the first stimulus has a context. The context module 210, in conjunction with the stimuli management module 212, may be configured to compare the context of the first stimulus with the set of defined contexts stored in the context container 210a. The context of the first stimulus may match the node association context stored in the context container 210a, thereby indicating the execution of operations for enabling the association of two or more nodes. In other words, the context module 210, in conjunction with the stimuli management module 212, may identify that the first stimulus is indicative of the association of two or more nodes of the executable graph-based model 100. The controller module 206, in conjunction with the stimuli management module 212, based on the context of the first stimulus, may be configured to identify, in the executable graph-based model 100, nodes required for processing the first stimulus. For the sake of ongoing discussion, it is assumed that the base nodes 602 and 604 are identified for the processing of the first stimulus. The controller module 206 may be further configured to execute an operation associated with the first stimulus on the base nodes 602 and 604 to create an aggregated node 618 that defines an association between the base nodes 602 and 604. The operation executed on the base nodes 602 and 604 to create the aggregated node 618 corresponds to at least one of a group consisting of a join operation and a merge operation. FIG. 6 illustrates the join or merge connection of the base nodes 602 and 604 by a single dotted line.

The aggregated node 618 has an information value 620 associated therewith. The information value 620 may be associated with data contained within the aggregated node 618 in consequence of the operation executed on the base nodes 602 and 604. Alternatively, the information value 620 may be associated with data generated by one or more non-security overlay nodes (not shown) associated with the aggregated node 618. As the aggregated node 618 defines the association between the base nodes 602 and 604, the information value 620 of the aggregated node 618 is equal to or greater than the information values 606 and 608. In an embodiment, the information value 620 is a collation of the information values 606 and 608. In another embodiment, the information value 620 is mutually exclusive of the information values 606 and 608. In yet another embodiment, the information value 620 includes the information values 606 and 608 and one or more additional information values. In other words, the information value 620 extends the information values 606 and 608.

In an embodiment, the aggregated node 618 is an edge node that defines a first connective relationship between the base node 602 and the edge node, and a second connective relationship between the base node 604 and the edge node.

Upon the creation of the aggregated node 618, the controller module 206, in conjunction with the security management module 220, dynamically associates a security overlay node 622, a security overlay node 624, and a security overlay node 626 with the aggregated node 618. The security overlay node 622, the security overlay node 624, and the security overlay node 626 are collectively referred to as a "third set of security overlay nodes 622-626". The third set of security overlay nodes 622-626 may be configured to control access to the aggregated node 618. Thus, a number of security overlay nodes associated with the aggregated node 618 (e.g., the third set of security overlay nodes 622-626) is different from a number of security overlay nodes associated with the base node 602 (e.g., the first set of security overlay nodes 610 and 612) and a number of security overlay nodes associated with the base node 604 (e.g., the second set of security overlay nodes 614 and 616). An overlay node type of the security overlay nodes 622-626 may be one of the same and different. For the sake of ongoing discussion, it is assumed that the security overlay nodes 622-626 correspond to role, encryption, and access overlay nodes, respectively.

As the information value 620 of the aggregated node 618 is equal to or greater than the information values 606 and 608, a third security level of the third set of security overlay nodes 622-626 is equal to or greater than the first security level of the first set of security overlay nodes 610 and 612 and the second security level of the second set of security overlay nodes 614 and 616. Thus, even though the aggregated node 618 has three security overlay nodes and the base nodes 602 and 604 cumulatively have four security overlay nodes, the level of security provided by the three security overlay nodes of the aggregated node 618 may be equal to or greater than the level of security provided by the four security overlay nodes of the base nodes 602 and 604.

The types and number of security overlay nodes defined for the base nodes 602 and 604 and the aggregated node 618 are not limited to the aforementioned scenario and may take various forms. In one embodiment, one or more overlay node types associated with the security overlay nodes 622-

626 may be different from one or more overlay node types associated with the security overlay nodes 610 and 612 and one or more overlay node types associated with the security overlay nodes 614 and 616. In another embodiment, the number of security overlay nodes associated with the aggregated node 618 (e.g., the third set of security overlay nodes 622-626) may be equal to or greater than a sum of the number of security overlay nodes associated with the base node 602 (e.g., the first set of security overlay nodes 610 and 612) and the number of overlay nodes associated with the base node 604 (e.g., the second set of security overlay nodes 614 and 616). The possible combinations of types and number of security overlay nodes defined for the base nodes 602 and 604 and the aggregated node 618 are innumerable, and it is not practical to include all possibilities in the present disclosure. However, in each such possibility, the third security level provided by the security overlay nodes associated with the aggregated node 618 is equal to or greater than the first security level provided by the security overlay nodes of the base node 602, the second security level provided by the security overlay nodes of the base node 604, and an aggregation of the first and second security levels.

Each set of security overlay nodes of the first set of security overlay nodes 610 and 612, the second set of security overlay nodes 614 and 616, and the third set of security overlay nodes 622-626 defines a list of access control elements that control access to the corresponding node. An access control element may correspond to at least one of a group consisting of (i) a role that has permission to access the corresponding node, (ii) a user, associated with the role, that has permission to access the corresponding node, (iii) a user access privilege for the corresponding node, and (iv) a rule that governs access to the corresponding node. In one embodiment, the list of access control elements associated with the third set of security overlay nodes 622-626 does not exceed the list of access control elements associated with the first set of security overlay nodes 610 and 612 and the list of access control elements associated with the second set of security overlay nodes 614 and 616. In another embodiment, the list of access control elements associated with the third set of security overlay nodes 622-626 is mutually exclusive to the list of access control elements associated with the first set of security overlay nodes 610 and 612 and the list of access control elements associated with the second set of security overlay nodes 614 and 616. In yet another embodiment, the list of access control elements associated with the third set of security overlay nodes 622-626 extends the list of access control elements associated with the first set of security overlay nodes 610 and 612 and the list of access control elements associated with the second set of security overlay nodes 614 and 616. In each of the afore-mentioned embodiments, the list of access control elements may be of the same or different type.

Although FIG. 6 describes that the base node 602, the base node 604, and the aggregated node 618 are associated with different types of security overlay nodes, the scope of the present disclosure is not limited to it. In other embodiments, the base node 602, the base node 604, and the aggregated node 618 may be associated with at least one common security overlay node type. If the common security overlay node type corresponds to the user overlay node, the list of users having permission to access the aggregated node 618 may not exceed, may be mutually exclusive to, or may extend the list of users having permission to access the base node 602 and the list of users having permission to access the base node 604.

Thus, as the information value associated with a node increases, the level of security associated therewith also increases.

The stimuli management module 212 may be further configured to receive a second stimulus of the set of stimuli 228, via the network 230. The second stimulus is associated with the overlay system 202 and corresponds to a command. Further, the second stimulus has a primary context and one or more secondary contexts associated therewith. The context module 210, in conjunction with the stimuli management module 212, may be configured to compare the primary context of the second stimulus with the set of defined contexts stored in the context container 210a. The primary context of the second stimulus may match the node access context stored in the context container 210a, thereby indicating the execution of operations for enabling access to one or more nodes of the executable graph-based model 100. In other words, the context module 210, in conjunction with the stimuli management module 212, may identify that the second stimulus is indicative of a request to access a node of the executable graph-based model 100. For the sake of ongoing description, it is assumed that the second stimulus is indicative of a request to access the aggregated node 618. The controller module 206, in conjunction with the context module 210 and the security management module 220, may be further configured to identify the security overlay nodes (e.g., the third set of security overlay nodes 622-626) associated with the aggregated node 618. In an embodiment, each overlay node has metadata that defines the associated type, and the metadata of all the overlay nodes of the executable graph-based model 100 may be accessed to identify the security overlay nodes, more particularly, the security overlay nodes (e.g., the third set of security overlay nodes 622-626) associated with the aggregated node 618.

Each set of security overlay nodes of the first set of security overlay nodes 610 and 612, the second set of security overlay nodes 614 and 616, and the third set of security overlay nodes 622-626 may have one or more configured contexts associated therewith that define access-granting characteristics associated with the corresponding node (e.g., the base nodes 602 and 604 and the aggregated node 618). Such configured contexts may include at least one of a role context, a user context, and an action context. The role context defines various roles having permission to access the corresponding node. The user context defines various users having permission to access the corresponding node. The action context defines various actions that can be performed on the corresponding node. Similarly, the one or more secondary contexts of the second stimulus may include at least one of the role context, the user context, and the action context. Here, the role context defines a role requesting access to the aggregated node 618, the user context defines a user requesting access to the aggregated node 618, and the action context defines the specific action information that is to be performed on the aggregated node 618.

The controller module 206, in conjunction with the context module 210 and the security management module 220, may be further configured to generate an access right for the second stimulus based on the one or more secondary contexts of the second stimulus and the one or more configured contexts of the third set of security overlay nodes 622-626. The one or more configured contexts of the third set of security overlay nodes 622-626 define the access-granting characteristics associated with the aggregated node 618, whereas the one or more secondary contexts of the second stimulus correspond to characteristics of the request.

The controller module 206, in conjunction with the context module 210 and the security management module 220, compares the one or more secondary contexts associated with the second stimulus and the one or more configured contexts associated with the third set of security overlay nodes 622-626. If the one or more secondary contexts associated with the second stimulus are different from the one or more configured contexts associated with the third set of security overlay nodes 622-626, access to the aggregated node 618 is denied. Based on the access right indicating that access to the aggregated node 618 is denied, the controller module 206, in conjunction with the context module 210 and the security management module 220, may be configured to generate a rejection notification. Conversely, if the one or more secondary contexts associated with the second stimulus are a match to the one or more configured contexts associated with the third set of security overlay nodes 622-626, access to the aggregated node 618 is granted. Based on the access right indicating that access to the aggregated node 618 is granted, the controller module 206, in conjunction with the context module 210 and the security management module 220, may be further configured to execute an operation associated with the second stimulus. The operation may be executed on the data record stored in the aggregated node 618. In an embodiment, the aggregated node 618 may be an executable node, and the execution of the operation associated with the second stimulus corresponds to the execution of a non-security overlay node (not shown) associated with the aggregated node 618. Thus, the second stimulus is processed based on the access right.

In a scenario, for one base node, an encryption overlay node is implemented to encrypt the data stored therein. Further, an access overlay node may be implemented, with the access overlay node being extended by another encryption overlay node with an encryption technique that is different from that of the base node. Additionally, the base node can be extended by a policy overlay node which is also extended by another encryption overlay node with an encryption technique that is different from those of the base node and the access overlay node. In such a scenario, to access the base node, three different encryption algorithms have to be broken. Even if an attacker is successful in that, the attacker would still have to find a workaround for the access and policy requirements of the access and policy overlay nodes, respectively, to be able to hack the base node. Thus, having the access and policy overlay nodes, with the encryption overlay nodes applied as a secondary to each of these overlay nodes as well as the base node, a secure system can be created, which is not possible in any other conventional applications.

To summarize, the information value associated with the base nodes may vary with time. Therefore, based on a change in information value associated with the base nodes, the level of security associated therewith may also vary. Utilization of such dynamic security provided a robust security mechanism for the executable graph-based model 100.

The memory management module 216 along with the storage management module 218 may load the base nodes 602 and 604 with corresponding processing logic and data, when the base nodes 602 and 604 are not loaded in the executable graph-based model 100. Subsequently, based on the loading of the base nodes 602 and 604, the security overlay nodes 610-616 and 622-626 are also loaded with corresponding processing logic and data. Once the base nodes 602 and 604 and the security overlay nodes 610-616 and 622-626 are loaded, the controller module 206 may be configured to use the base nodes 602 and 604 and the security overlay nodes 610-616 and 622-626 to execute the set of operations for performing stimulus processing of the second stimulus. In the present disclosure, as the security is implemented at the node level, the data record of a base node can remain protected (e.g., encrypted) when it is loaded from the secondary storage to the primary storage (e.g., the executable graph-based model 100) and can be converted to original data format on demand (e.g., during stimulus processing).

In the present disclosure, a security overlay node of the first set of security overlay nodes 610 and 612, the second set of security overlay nodes 614 and 616, and the third set of security overlay nodes 622-626 may be a stateful overlay node or a stateless overlay node. Based on the security overlay node being the stateful overlay node, an execution output associated with the security overlay node is persistent and is accessible to the processing circuitry (e.g., the stimuli management module 212, the context module 210, the controller module 206, and the security management module 220) for performing one or more access control operations on a corresponding node for a predefined time-interval. Conversely, based on the security overlay node being the stateless overlay node, the execution output is non-persistent, and the processing logic associated with the security overlay node is re-executed based on a requirement of the execution output.

Throughout the description, each node that is represented in a corresponding figure as an inner circle enclosed within an outer circle is an executable node. The inner circle represents its base node, and the outer circle represents an overlay node associated therewith. Further, the coupling of inner circles of nodes (e.g., the base nodes 602 and 604) represents an association therebetween. A coupling between the outer circle and a node (e.g., a coupling between the outer circle of the base node 602 and the security overlay nodes 610 and 612) indicates that the node is an overlay of the base node.

Although it is shown in FIG. 6 that two base nodes are associated (e.g., combined) to create an aggregated node, the scope of the present disclosure is not limited to it. In other embodiments, more than two base nodes can be combined to create the aggregated node. Similarly, two or more aggregated nodes can be combined to create another aggregated node which has a higher security requirement as compared to that of the combining aggregated nodes.

In FIG. 6, each base node is shown to be a standalone node. The scope of the present disclosure is however not limited to it. In the present disclosure, the executable graph-based model 100 may include various node groups, with base nodes, within a node group or of different node groups, being combined to create aggregated nodes. One such example is illustrated in FIG. 7.

Figure 7:
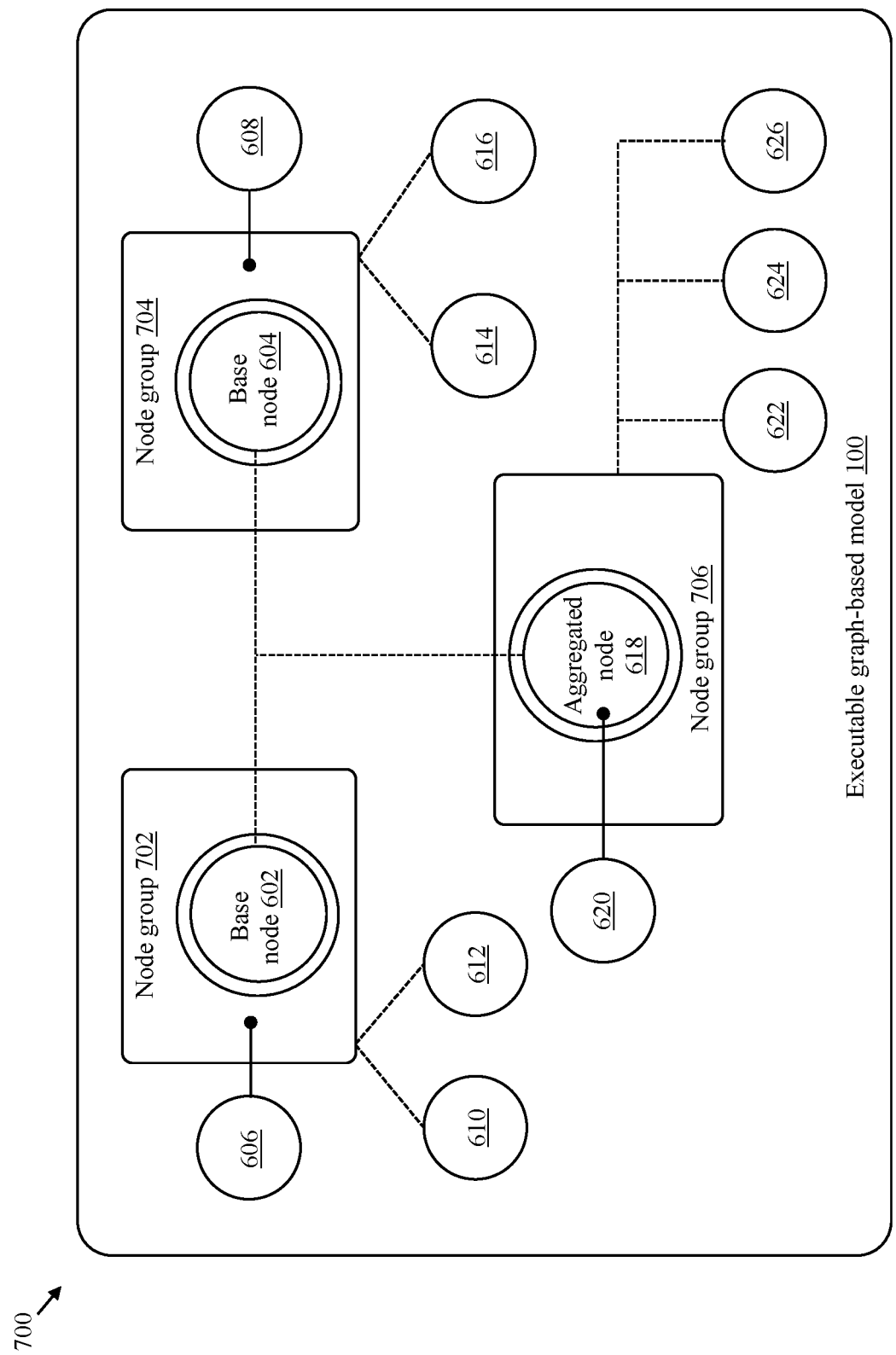
FIG. 7 is a schematic diagram that illustrates facilitation of the dynamic security for the executable graph-based model of FIG. 1, in accordance with another embodiment of the present disclosure.

FIG. 7 is a schematic diagram 700 that illustrates facilitation of dynamic security for the executable graph-based model 100, in accordance with another embodiment of the present disclosure.

In the executable graph-based model 100 illustrated in FIG. 7, the base nodes 602 and 604 are shown to be part of node groups 702 and 704, respectively. The first set of security overlay nodes 610 and 612 is associated with the node group 702 such that the base node 602 inherits the first set of security overlay nodes 610 and 612 from the node group 702. Similarly, the second set of security overlay nodes 614 and 616 is associated with the node group 704 such that the base node 604 inherits the second set of security overlay nodes 614 and 616 from the node group

704. Further, in such a scenario, the aggregated node 618, created due to the association of the base nodes 602 and 604, corresponds to a node group 706 that represents an aggregation of the base nodes 602 and 604. The third set of security overlay nodes 622-626 are dynamically associated with the aggregated node 618, and in turn, the node group 706.

Although it is shown that the node group 702 includes the base node 602 and the node group 704 includes the base node 604, the scope of the present disclosure is not limited to it. In other embodiments, the node groups 702 and 704 may include more base nodes. Additionally, the node group 702 and the node group 704 may be associated with various other security overlay nodes, and each base node added to the corresponding node group may inherit such security overlay nodes.

The scope of the present disclosure is not limited to each node being included in separate node groups. In an alternate embodiment, the base node 602, the base node 604, and the aggregated node 618 constitute a node group (not shown). Such a node group is required to have a security level that is equal to or greater than the highest security level of the associated nodes. Thus, the third set of security overlay nodes 622-626 may be associated with such a node group to provide security thereto. The stimuli management module 212 may be further configured to receive a third stimulus of the set of stimuli 228, via the network 230. The third stimulus is associated with the overlay system 202 and corresponds to a command. The third stimulus has a context. The context module 210, in conjunction with the stimuli management module 212, may be configured to compare the context of the third stimulus with the set of defined contexts stored in the context container 210a. The context of the third stimulus may match the node addition context stored in the context container 210a, thereby indicating the execution of operations for adding nodes to the overlay system 202. In other words, the context module 210, in conjunction with the stimuli management module 212, may identify that the third stimulus is indicative of a node addition operation. The controller module 206, in conjunction with the stimuli management module 212, based on the context of the third stimulus, may be further configured to create, in the node group, a base node (not shown) that is different than the base node 602, the base node 604, and the aggregated node 618. Upon the creation of the base node based on the third stimulus, the security management module 220, in conjunction with the controller module 206, may be configured to dynamically associate a fourth set of security overlay nodes (not shown) with the newly added base node. The security level of the fourth set of security overlay nodes is equal to or greater than the security level of the third set of security overlay nodes 622-626 (e.g., the security level of the node group). Thus, when a node is added to a node group, the security level required for that node is equal to or greater than the security level of the node group.

Although not shown, in the present disclosure, two node groups can also be combined to create an aggregated node group, with the security level associated with the aggregated node group being equal to or greater than the security levels of the two combining node groups.

Although in FIGS. 6 and 7, the nodes (e.g., the base node 602, the base node 604, and the aggregated data node 618) are described to be non-templatized nodes, the scope of the present disclosure is not limited to it. In other embodiments, each of the base nodes 602 and 604 and the aggregated node 618 may correspond to a run-time node comprising a node template and at least one node instance, without deviating from the scope of the present disclosure. In such a scenario, the security overlay nodes (e.g., the security overlay nodes 610 and 612) may be associated with the node instance of the base node 602, the security overlay nodes (e.g., the security overlay nodes 614 and 616) may be associated with the node instance of the base node 604, and the security overlay nodes (e.g., the security overlay nodes 622-626) may be associated with the node instance of the aggregated node 618 to provide security thereto. Additionally, in some embodiments, the security overlay nodes may also be associated with the node template to provide security thereto.

Figure 8:
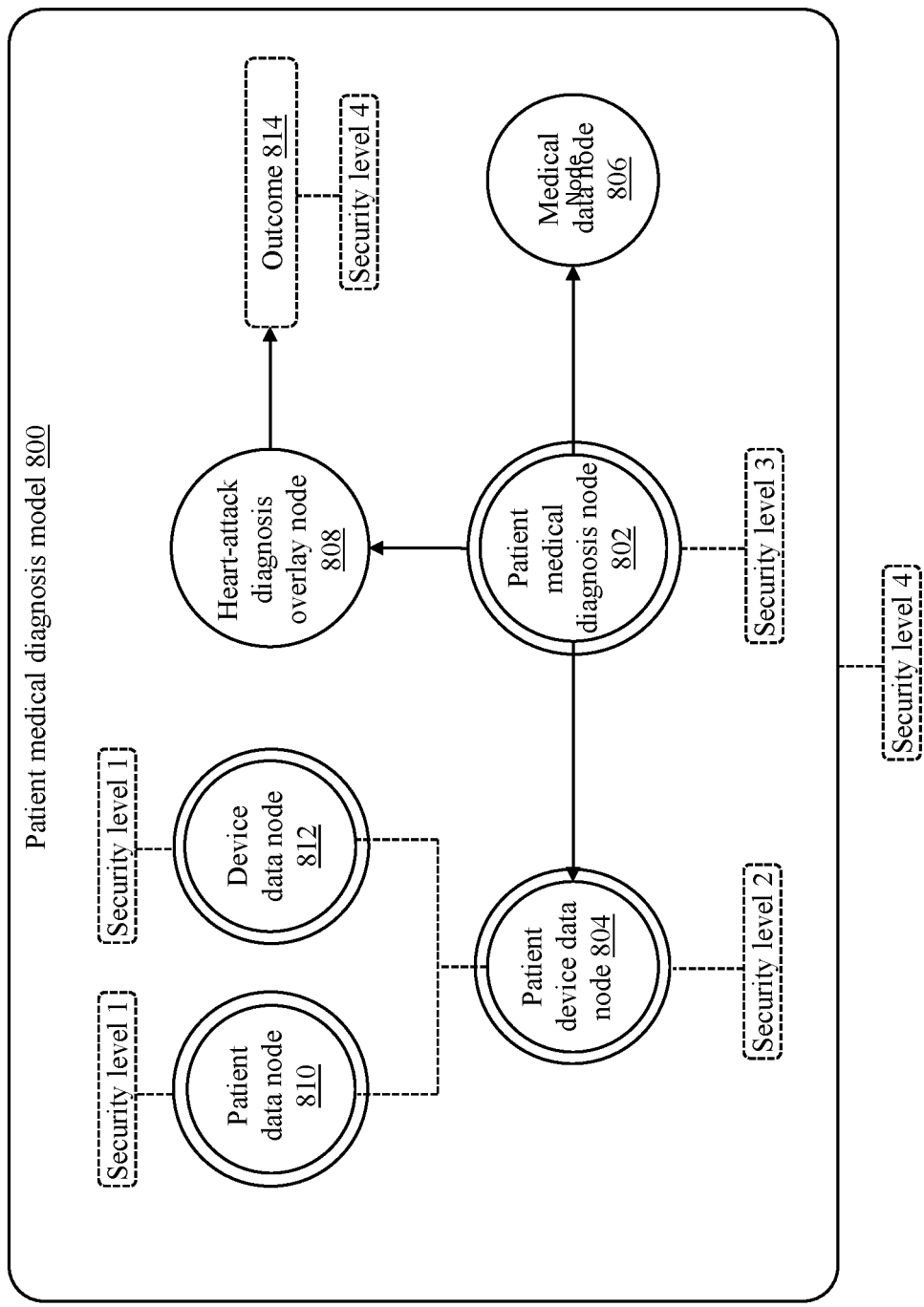
FIG. 8 is a schematic diagram that illustrates an example implementation of dynamic security for an executable graph-based patient medical diagnosis model, in accordance with an embodiment of the present disclosure.

FIG. 8 is a schematic diagram that illustrates an example implementation of dynamic security for an executable graph-based patient medical diagnosis model 800, in accordance with an embodiment of the present disclosure. Referring to FIG. 8, the executable graph-based patient medical diagnosis model 800 corresponds to an executable graph-based model generated for medical diagnosis, and is hereinafter referred to as the "patient medical diagnosis model 800". The patient medical diagnosis model 800 includes the patient medical diagnosis node 802, a patient device data node 804, and a medical data node 806. The patient medical diagnosis node 802 corresponds to an edge node joining two vertex nodes, namely, the patient device data node 804 and the medical data node 806. The patient medical diagnosis node 802 is extended by an overlay, e.g., a heart-attack diagnosis overlay node 808. That is to say, the heart-attack diagnosis overlay node 808 is an overlay of the patient medical diagnosis node 802.

The medical data node 806 stores universally available medical data (e.g., heart-attack analysis data). The patient device data node 804 is created by associating two different nodes, namely, a patient data node 810 and a device data node 812. The patient data node 810 stores patient information (e.g., name, date of birth, or the like) of a patient, whereas, the device data node 812 stores medical device data (e.g., medical history, blood work reports, heart rate monitoring data, electrocardiogram data, pulse oximeter data, or the like) of the patient. The heart-attack diagnosis overlay node 808 may generate an outcome 814 indicative of the heart-attack diagnosis for the patient based on the data records stored in the patient device data node 804 and the medical data node 806. The outcome 814 may be generated in response to a stimulus. The outcome 814 may indicate whether the patient has suffered a heart-attack or not. The outcome 814 may be further stored in another node (not shown).

As the medical data node 806 includes universally available data, no security mechanism is implemented for the medical data node 806. Further, each of the patient medical diagnosis node 802, the patient device data node 804, the patient data node 810, and the device data node 812 are extended by security overlay nodes (not shown). To illustrate the presence of security overlay nodes in the patient medical diagnosis model 800, the patient medical diagnosis node 802, the patient device data node 804, the patient data node 810, and the device data node 812 are represented by concentric circles. The security level of each node depends on the information value contained therein. Thus, the patient data node 810 and the device data node 812 may have the first level of security (shown in FIG. 8 as 'Security level 1'). The patient device data node 804 is an aggregated node defining the association of the patient data node 810 and the device data node 812. Thus, the patient device data node 804 may have the second level of security (shown in FIG. 8 as 'Security level 2') that is greater than the first level of security. The aggregated node thus has higher security than the associated nodes. The patient medical diagnosis node 802 also represents an aggregated node. In such a scenario, the patient medical diagnosis node 802 may have the third level of security (shown in FIG. 8 as 'Security level 3') that is greater than the second level of security.

Thus, as the information value of the nodes increases, the level of security increases. Additionally, the node storing the outcome 814 has the highest information value, and hence, may have the highest level of security, i.e., a fourth level of security (shown in FIG. 8 as 'Security level 4'). Additionally, as the patient medical diagnosis model 800 corresponds to a logical grouping of various nodes included therein, the security level of the patient medical diagnosis model 800 is required to be equal to or greater than the highest security level of the associated nodes. Thus, the patient medical diagnosis model 800 may have the fourth level of security. Further, when a stimulus requesting access to any of the nodes of the patient medical diagnosis model 800 is received, the processing of such a stimulus may be executed in a manner that is similar to the processing of the second stimulus described above.

Figure 9:
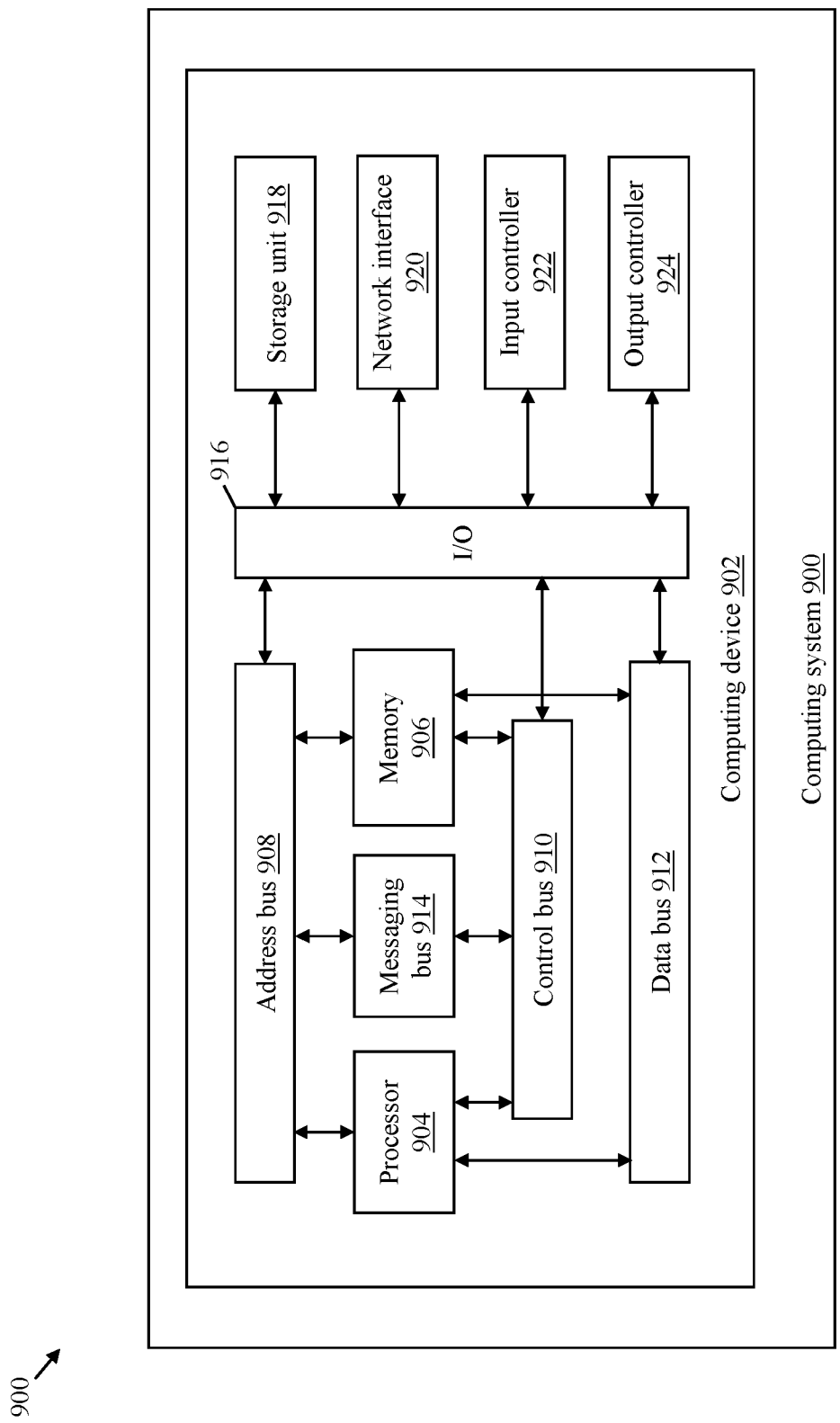
FIG. 9 shows an example computing system for carrying out the methods of the present disclosure, in accordance with an embodiment of the present disclosure.

FIG. 9 shows an example computing system 900 for carrying out the methods of the present disclosure, in accordance with an embodiment of the present disclosure. Specifically, FIG. 9 shows a block diagram of an embodiment of the computing system 900 according to example embodiments of the present disclosure.

The computing system 900 may be configured to perform any of the operations disclosed herein, such as, for example, any of the operations discussed with reference to the functional modules described in relation to FIG. 2. The computing system 900 can be implemented as a conventional computer system, an embedded controller, a laptop, a server, a mobile device, a smartphone, a set-top box, a kiosk, a vehicular information system, one or more processors associated with a television, a customized machine, any other hardware platform, or any combination or multiplicity thereof. In one embodiment, the computing system 900 is a distributed system configured to function using multiple computing machines interconnected via a data network or bus system.

The computing system 900 includes computing devices (such as a computing device 902). The computing device 902 includes one or more processors (such as a processor 904) and a memory 906. The processor 904 may be any general-purpose processor(s) configured to execute a set of instructions. For example, the processor 904 may be a processor core, a multiprocessor, a reconfigurable processor, a microcontroller, a digital signal processor (DSP), an application-specific integrated circuit (ASIC), a graphics processing unit (GPU), a neural processing unit (NPU), an accelerated processing unit (APU), a brain processing unit (BPU), a data processing unit (DPU), a holographic processing unit (HPU), an intelligent processing unit (IPU), a microprocessor/microcontroller unit (MPU/MCU), a radio processing unit (RPU), a tensor processing unit (TPU), a vector processing unit (VPU), a wearable processing unit (WPU), a field programmable gate array (FPGA), a programmable logic device (PLD), a controller, a state machine, gated logic, discrete hardware component, any other processing unit, or any combination or multiplicity thereof. In one embodiment, the processor 904 may be multiple processing units, a single processing core, multiple processing cores, special purpose processing cores, co-processors, or any combination thereof. The processor 904 may be communicatively coupled to the memory 906 via an address bus 908, a control bus 910, a data bus 912, and a messaging bus 914.

The memory 906 may include non-volatile memories such as a read-only memory (ROM), a programmable read-only memory (PROM), an erasable programmable read-only memory (EPROM), a flash memory, or any other device capable of storing program instructions or data with or without applied power. The memory 906 may also include volatile memories, such as a random-access-memory (RAM), a static random-access-memory (SRAM), a dynamic random-access-memory (DRAM), and a synchronous dynamic random-access-memory (SDRAM). The memory 906 may include single or multiple memory modules. While the memory 906 is depicted as part of the computing device 902, a person skilled in the art will recognize that the memory 906 can be separate from the computing device 902.

The memory 906 may store information that can be accessed by the processor 904. For instance, the memory 906 (e.g., one or more non-transitory computer-readable storage mediums, memory devices) may include computer-readable instructions (not shown) that can be executed by the processor 904. The computer-readable instructions may be software written in any suitable programming language or may be implemented in hardware. Additionally, or alternatively, the computer-readable instructions may be executed in logically and/or virtually separate threads on the processor 904. For example, the memory 906 may store instructions (not shown) that when executed by the processor 904 cause the processor 904 to perform operations such as any of the operations and functions for which the computing system 900 is configured, as described herein. Additionally, or alternatively, the memory 906 may store data (not shown) that can be obtained, received, accessed, written, manipulated, created, and/or stored. The data can include, for instance, the data and/or information described herein in relation to FIGS. 1-8. In some implementations, the computing device 902 may obtain from and/or store data in one or more memory device(s) that are remote from the computing system 900.

The computing device 902 may further include an input/output (I/O) interface 916 communicatively coupled to the address bus 908, the control bus 910, and the data bus 912. The data bus 912 and messaging bus 914 may include a plurality of tunnels that may support parallel execution of messages by the overlay system 202. The I/O interface 916 is configured to couple to one or more external devices (e.g., to receive and send data from/to one or more external devices). Such external devices, along with the various internal devices, may also be known as peripheral devices. The I/O interface 916 may include both electrical and physical connections for operably coupling the various peripheral devices to the computing device 902. The I/O interface 916 may be configured to communicate data, addresses, and control signals between the peripheral devices and the computing device 902. The I/O interface 916 may be configured to implement any standard interface, such as a small computer system interface (SCSI), a serial-attached SCSI (SAS), a fiber channel, a peripheral component interconnect (PCI), a PCI express (PCIe), a serial bus, a parallel bus, an advanced technology attachment (ATA), a serial ATA (SATA), a universal serial bus (USB), Thunderbolt, FireWire, various video buses, and the like. The I/O interface 916 is configured to implement only one interface or bus technology. Alternatively, the I/O interface 916 is configured to implement multiple interfaces or bus technologies. The I/O interface 916 may include one or more buffers for buffering transmissions between one or more external devices, internal devices, the computing device 902, or the processor 904. The I/O interface 916 may couple the computing device 902 to various input devices, including mice, touch screens, scanners, biometric readers, electronic digitizers, sensors, receivers, touchpads, trackballs, cameras, microphones, keyboards, any other pointing devices, or any combinations thereof. The I/O interface 916 may couple the computing device 902 to various output devices, including video displays, speakers, printers, projectors, tactile feedback devices, automation control, robotic components, actuators, motors, fans, solenoids, valves, pumps, transmitters, signal emitters, lights, and so forth.

The computing system 900 may further include a storage unit 918, a network interface 920, an input controller 922, and an output controller 924. The storage unit 918, the network interface 920, the input controller 922, and the output controller 924 are communicatively coupled to the central control unit (e.g., the memory 906, the address bus 908, the control bus 910, and the data bus 912) via the I/O interface 916. The network interface 920 communicatively couples the computing system 900 to one or more networks such as wide area networks (WAN), local area networks (LAN), intranets, the Internet, wireless access networks, wired networks, mobile networks, telephone networks, optical networks, or combinations thereof. The network interface 920 may facilitate communication with packet-switched networks or circuit-switched networks which use any topology and may use any communication protocol. Communication links within the network may involve various digital or analog communication media such as fiber optic cables, free-space optics, waveguides, electrical conductors, wireless links, antennas, radio-frequency communications, and so forth.

The storage unit 918 is a computer-readable medium, preferably a non-transitory computer-readable medium, comprising one or more programs, the one or more programs comprising instructions which when executed by the processor 904 cause the computing system 900 to perform the method steps of the present disclosure. Alternatively, the storage unit 918 is a transitory computer-readable medium. The storage unit 918 can include a hard disk, a floppy disk, a compact disc read-only memory (CD-ROM), a digital versatile disc (DVD), a Blu-ray disc, a magnetic tape, a flash memory, another non-volatile memory device, a solid-state drive (SSD), any magnetic storage device, any optical storage device, any electrical storage device, any semiconductor storage device, any physical-based storage device, any other data storage device, or any combination or multiplicity thereof. In one embodiment, the storage unit 918 stores one or more operating systems, application programs, program modules, data, or any other information. The storage unit 918 is part of the computing device 902. Alternatively, the storage unit 918 is part of one or more other computing machines that are in communication with the computing device 902, such as servers, database servers, cloud storage, network attached storage, and so forth.

The input controller 922 may include suitable logic, circuitry, interfaces, and/or code, executable by the circuitry, that may be configured to control one or more input devices that may be configured to receive an input (the set of stimuli 228) for the overlay system 202. The output controller 924 may include suitable logic, circuitry, interfaces, and/or code, executable by the circuitry, that may be configured to control one or more output devices that may be configured to render/output the outcome of the operation executed to process the received input (the set of stimuli 228).

Figure 10A:
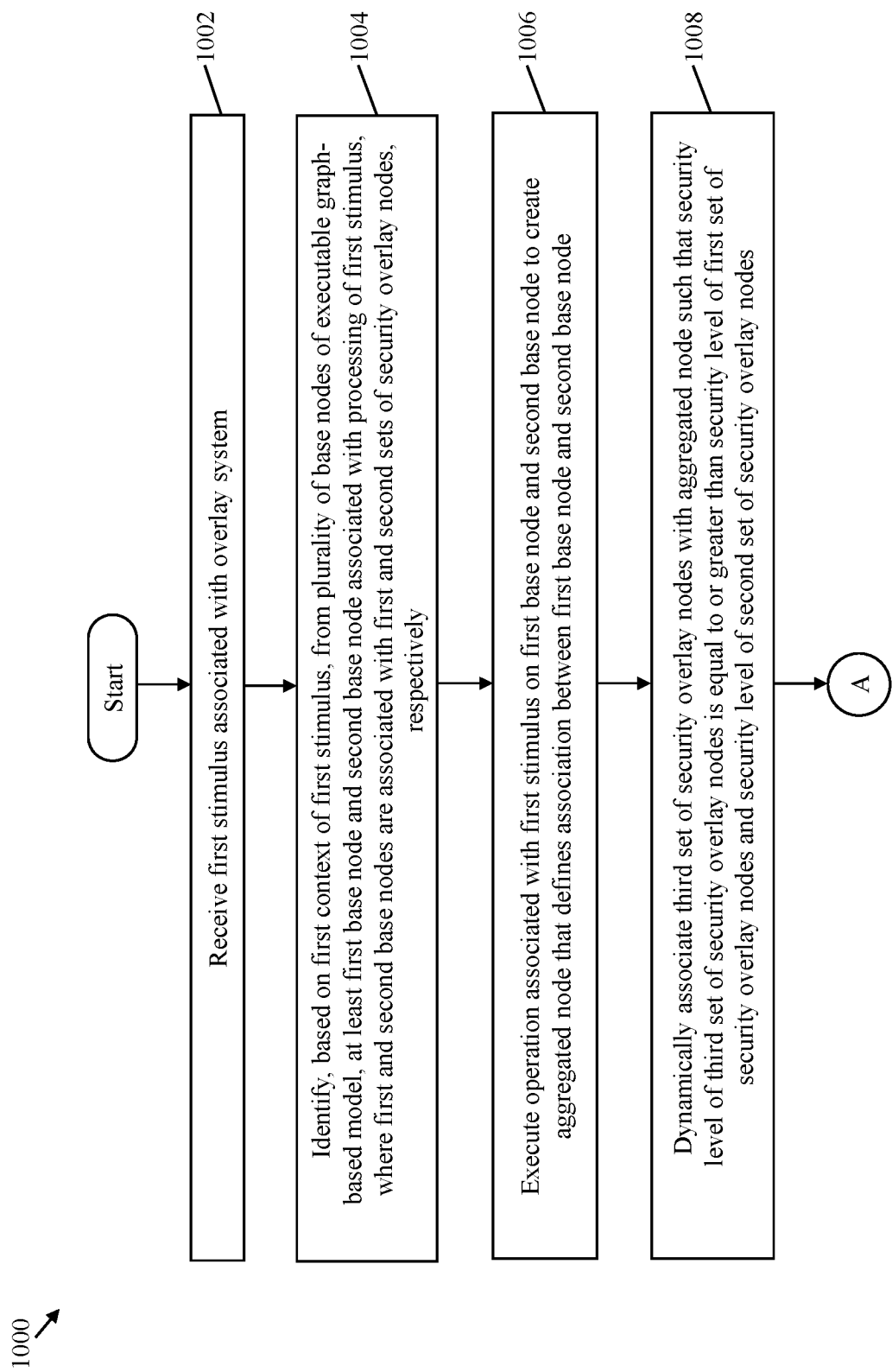
FIGS. 10A and 10B, collectively, represents a flowchart that illustrates a method for facilitating the dynamic security for the executable graph-based model of FIG. 1, in accordance with an embodiment of the present disclosure.
Figure 10B:
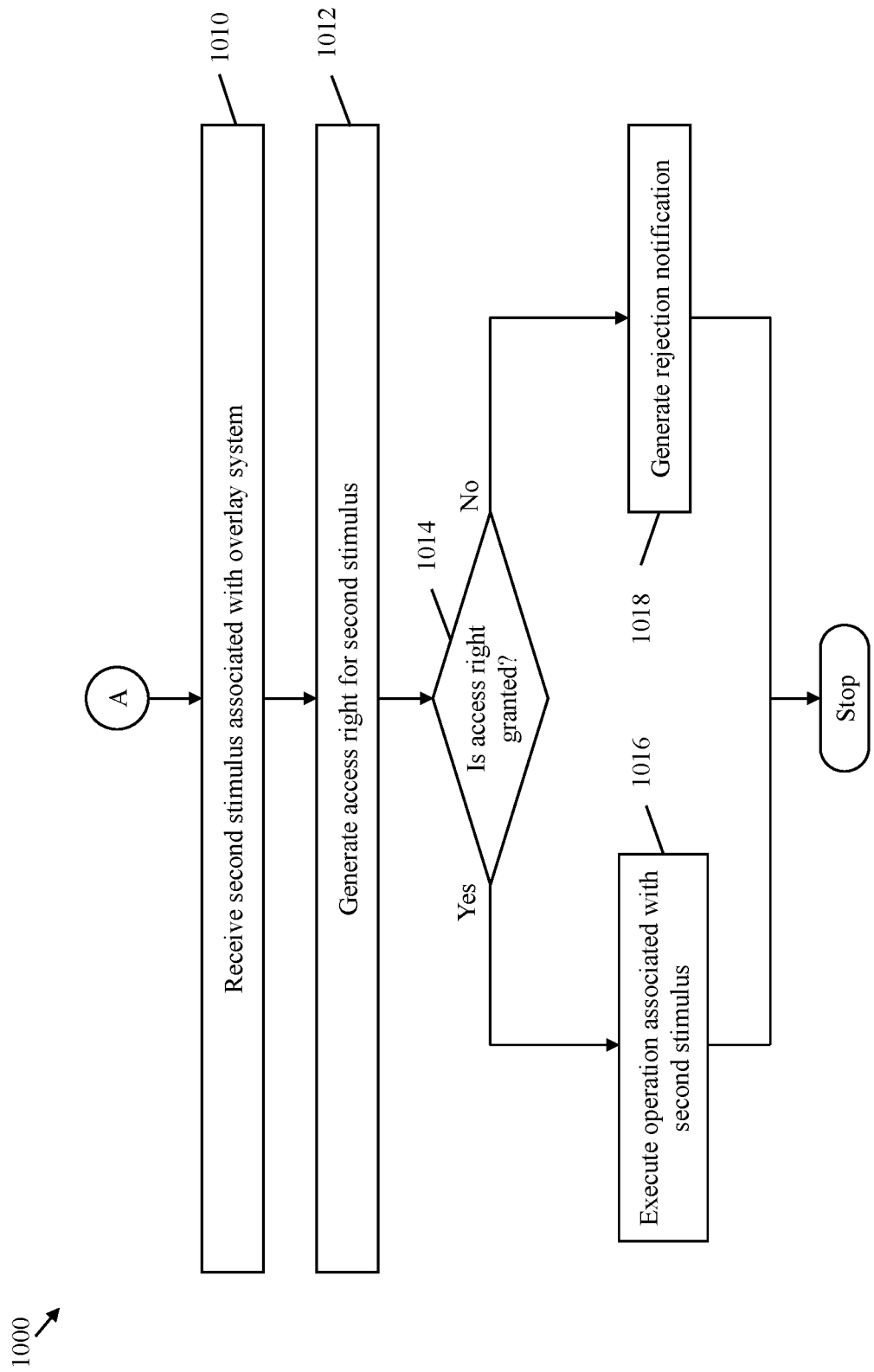

FIGS. 10A and 10B collectively, represents a flowchart 1000 that illustrates a method for facilitating dynamic security for graph-based model 100, in accordance with an embodiment of the present disclosure.

Referring to FIG. 10A, at 1002, the processing circuitry (e.g., the stimuli management module 212) of the overlay system 202 receives the first stimulus associated with the overlay system 202. At 1004, the processing circuitry (e.g., the controller module 206, in conjunction with the stimuli management module 212) identifies, based on a context of the first stimulus, from the plurality of base nodes of the executable graph-based model 100, at least a first base node (e.g., the base node 602) and a second base node (e.g., the base node 604) associated with the processing of the first stimulus. The base nodes 602 and 604 are associated with the first set of security overlay nodes 610 and 612 and the second set of security overlay nodes 614 and 616, respectively. At 1006, the processing circuitry (e.g., the controller module 206) executes the operation associated with the first stimulus on the first and second base nodes (e.g., the base nodes 602 and 604) to create an aggregated node (e.g., the aggregated node 618) that defines an association between the first and second base nodes. At 1008, the processing circuitry (e.g., the controller module 206, in conjunction with the security management module 220) dynamically associates the third set of security overlay nodes 622-626 with the aggregated node 618 such that the security level of the third set of security overlay nodes 622-628 is equal to or greater than the first security level of the first set of security overlay nodes 610 and 612 and the second security level of the second set of security overlay nodes 614 and 616.

Referring to FIG. 10B, at 1010, the processing circuitry (e.g., the stimuli management module 212) of the overlay system 202 receives the second stimulus associated with the overlay system 202. At 1012, the processing circuitry (e.g., the controller module 206, in conjunction with the context module 210 and the security management module 220) generates the access right for the second stimulus. At 1014, the processing circuitry (e.g., the controller module 206, in conjunction with the context module 210 and the security management module 220) determines whether the access right is granted. If at 1014, it is determined that the access right is granted, 1016 is executed. At 1016, the processing circuitry (e.g., the controller module 206, in conjunction with the context module 210 and the security management module 220) executes the operation associated with the second stimulus. If at 1014, it is determined that the access right is not granted, 1018 is executed. At 1018, the processing circuitry (e.g., the controller module 206, in conjunction with the context module 210 and the security management module 220) generates the rejection notification indicating that the access is denied.

The disclosed embodiments encompass numerous advantages including a secured and seamless approach for dynamic security for executable graph-based models. The systems and methods disclosed herein provide an ability to imply dynamic security for executable graph-based model 100. In the majority of instances, the confidentiality and sensitivity associated with the nodes may vary. Some nodes may contain extremely sensitive data while some may contain general information. Depending on the importance of the information contained within the nodes, the systems and methods disclosed herein dynamically associate one or more security overlay nodes with each node. Therefore, with the increase in information value in the nodes, the security level of the security overlay nodes associated with the nodes also increases. Further, providing security at the node level allows the user to only access the required node, thereby limiting access to the entire database. Additionally, the present disclosure provides security to each data record when offline (data-at-rest) as well as can be applied in real-time when loaded into the executable graph-based model. This mechanism further facilitates on-demand decryption of the data records in the executable graph-based model, unlike the traditional security mechanism where the entire database is decrypted once loaded into the application space. The application area of the systems and methods disclosed herein may include, but are not limited to, cyber-security, finance, banking, industrial processes, robotics, home security, the automation industry, or the like.

Certain embodiments of the disclosure may be found in the disclosed systems, methods, and non-transitory computer-readable medium, for facilitating dynamic security for executable graph-based models. The methods and systems disclosed herein include various operations performed by the processing circuitry (e.g., the controller module 206, the context module 210, the stimuli management module 212, the security management module 220, any other element of the overlay system 202, or a combination of two or more elements of the overlay system 202). The overlay system disclosed herein includes the storage element configured to store an executable graph-based model that comprises a plurality of base nodes and a plurality of security overlay nodes, where each base node is associated with a set of security overlay nodes that is configured to control access to the corresponding base node. The processing circuitry is coupled to the storage element and is configured to receive a first stimulus associated with the overlay system. The first stimulus is indicative of an association of two or more nodes. Further, the processing circuitry identifies based on the first stimulus, from the plurality of base nodes, at least a first base node and a second base node that are required for processing of the first stimulus. The first base node and the second base node are associated with a first set of security overlay nodes and a second set of security overlay nodes, of the plurality of security overlay nodes, respectively. The processing circuitry is further configured to execute an operation associated with the first stimulus on the first base node and the second base node to create an aggregated node. The aggregated node defines an association between the first base node and the second base node. Further, the processing circuitry dynamically associates a third set of security overlay nodes with the aggregated node. A security level of the third set of security overlay nodes is equal to or greater than a security level of the first set of security overlay nodes and a security level of the second set of security overlay nodes.

In some embodiments, the operation executed on the first base node and the second base node to create the aggregated node corresponds to at least one of a group consisting of a join operation and a merge operation.

In some embodiments, the first base node has a first information value, the second base node has a second information value, and the aggregated node has a third information value that is equal to or greater than the first information value and the second information value.

In some embodiments, the third information value is associated with one of a group consisting of (i) data contained within the aggregated node in consequence of the operation executed on the first base node and the second base node, and (ii) data generated by one or more non-security overlay nodes associated with the aggregated node.

In some embodiments, the processing circuitry is further configured to receive a second stimulus associated with the overlay system. The second stimulus is indicative of a request to access the aggregated node. the processing circuitry is further configured to generate an access right for the second stimulus based on one or more contexts of the second stimulus and one or more contexts of the third set of security overlay nodes. The one or more contexts of the third set of security overlay nodes define access-granting characteristics associated with the aggregated node, whereas the one or more contexts of the second stimulus correspond to characteristics of the request. Further, the second stimulus is processed based on the access right.

In some embodiments, the processing circuitry is further configured to generate a rejection notification based on the access right being indicative of access to the aggregated node being denied. The access to the aggregated node is denied based on the one or more contexts of the second stimulus being different from the one or more contexts of the third set of security overlay nodes.

In some embodiments, the processing circuitry is further configured to execute an operation associated with the second stimulus based on the access right being indicative of access to the aggregated node being granted. The access to the aggregated node is granted based on the one or more contexts of the second stimulus being a match to the one or more contexts of the third set of security overlay nodes.

In some embodiments, the aggregated node is an executable node and the execution of the operation associated with the second stimulus corresponds to execution of a non-security overlay node associated with the aggregated node.

In some embodiments, an overlay node type of each security overlay node of the first set of security overlay nodes is one of same and different. Further, the overlay node type of each security overlay node of the second set of security overlay nodes is one of same and different. Additionally, the overlay node type of each security overlay node of the third set of security overlay nodes is one of same and different.

In some embodiments, one or more overlay node types associated with the third set of security overlay nodes are different from one or more overlay node types associated with the first set of security overlay nodes and one or more overlay node types associated with the second set of security overlay nodes.

In some embodiments, a number of overlay nodes of the third set of security overlay nodes is different from a number of overlay nodes of the first set of security overlay nodes and a number of overlay nodes of the second set of security overlay nodes.

In some embodiments, each of the first set of security overlay nodes, the second set of security overlay nodes, and the third set of security overlay nodes comprises at least one of a group consisting of a role overlay node, a user overlay node, an access overlay node, a policy overlay node, an encryption overlay node, and an obfuscation overlay node. The role overlay node defines a list of roles that have permission to access the corresponding node. The user overlay node defines a list of users, associated with a role of the list of roles that have permission to access the corresponding node. The access overlay node defines one or more user access privileges for the corresponding node. The policy overlay node defines one or more rules that govern access to the corresponding node. The encryption overlay node encodes data of the corresponding node, and the obfuscation overlay node creates an obfuscated version of the data of the corresponding node.

In some embodiments, each set of security overlay nodes of the first set of security overlay nodes, the second set of security overlay nodes, and the third set of security overlay nodes defines a list of access control elements that control access to the corresponding node. The access control element corresponds to at least one of a group consisting of (i) a role that has permission to access the corresponding node, (ii) a user, associated with the role, that has permission to access the corresponding node, (iii) a user access privilege for the corresponding node, and (iv) a rule that governs access to the corresponding node.

In some embodiments, the list of access control elements associated with the third set of security overlay nodes does not exceed the list of access control elements associated with the first set of security overlay nodes and the list of access control elements associated with the second set of security overlay nodes.

In some embodiments, the list of access control elements associated with the third set of security overlay nodes is mutually exclusive to the list of access control elements associated with the first set of security overlay nodes and the list of access control elements associated with the second set of security overlay nodes.

In some embodiments, the list of access control elements associated with the third set of security overlay nodes extends the list of access control elements associated with the first set of security overlay nodes and the list of access control elements associated with the second set of security overlay nodes.

In some embodiments, the first base node is part of a first node group, and the first set of security overlay nodes is associated with the first node group such that the first base node inherits the first set of security overlay nodes from the first node group. Further, the second base node is part of a second node group, and the second set of security overlay nodes is associated with the second node group such that the second base node inherits the second set of security overlay nodes from the second node group. Additionally, the aggregated node corresponds to a third node group that represents an aggregation of the first base node and the second base node, with the third set of security overlay nodes being dynamically associated with the aggregated node.

In some embodiments, the first base node, the second base node, and the aggregated node constitute a node group, such that the third set of security overlay nodes is associated with the node group. The processing circuitry is further configured to receive a third stimulus indicative of a node addition operation. The processing circuitry creates a third base node in the node group, based on the third stimulus. Further, the processing circuitry dynamically associates a fourth set of security overlay nodes with the third base node. The security level of the fourth set of security overlay nodes is equal to or greater than the security level of the third set of security overlay nodes. In some embodiments, the aggregated node is an edge node that defines a first connective relationship between the first base node and the edge node, and a second connective relationship between the second base node and the edge node.

In some embodiments, a security overlay node of the first set of security overlay nodes, the second set of security overlay nodes, and the third set of security overlay nodes is one of a group consisting of (i) a stateful overlay node and (ii) a stateless overlay node. When the security overlay node corresponds to the stateful overlay node, an execution output associated with the security overlay node is persistent and is accessible to the processing circuitry for performing one or more access control operations on a corresponding node for a predefined time-interval. When the security overlay node corresponds to the stateless overlay node, the execution output is non-persistent and processing logic associated with the security overlay node is re-executed based on a requirement of the execution output.

In some embodiments, each base node of the first plurality of base nodes and the aggregated data nodes comprises (i) a node template that corresponds to a predefined node structure and (ii) a node instance that corresponds to an implementation of the node template such that the plurality of base nodes comprises a plurality of node templates and a plurality of node instances. Further, the set of security overly nodes of the plurality of security overlay nodes corresponds to an overlay of the node instance.

A person of ordinary skill in the art will appreciate that embodiments and exemplary scenarios of the disclosed subject matter may be practiced with various computer system configurations, including multi-core multiprocessor systems, minicomputers, mainframe computers, computers linked or clustered with distributed functions, as well as pervasive or miniature computers that may be embedded into virtually any device. Further, the operations may be described as a sequential process, however, some of the operations may be performed in parallel, concurrently, and/or in a distributed environment, and with program code stored locally or remotely for access by single or multiprocessor machines. In addition, in some embodiments, the order of operations may be rearranged without departing from the spirit of the disclosed subject matter.

Techniques consistent with the present disclosure provide, among other features, systems and methods for facilitating dynamic security for graph-based models. While various embodiments of the disclosed systems and methods have been described above, it should be understood that they have been presented for purposes of example only, and not limitations. It is not exhaustive and does not limit the present disclosure to the precise form disclosed. Modifications and variations are possible in light of the above teachings or may be acquired from practicing the present disclosure, without departing from the breadth or scope.

Moreover, for example, the present technology/system may achieve the following configurations:

1. An overlay system, comprising:
  a storage element configured to store an executable graph-based model that comprises a plurality of base nodes and a plurality of security overlay nodes, where each base node is associated with a set of security overlay nodes that is configured to control access to the corresponding base node; and
  processing circuitry that is coupled to the storage element, and configured to:
    receive a first stimulus associated with the overlay system, wherein the first stimulus is indicative of association of two or more nodes;
    identify, based on the first stimulus, from the plurality of base nodes, at least a first base node and a second base node required for processing of the first stimulus, wherein the first base node and the second base node are associated with a first set of security overlay nodes and a second set of security overlay nodes, of the plurality of security overlay nodes, respectively;
    execute an operation associated with the first stimulus on the first base node and the second base node to create an aggregated node that defines an association between the first base node and the second base node; and
    dynamically associate a third set of security overlay nodes with the aggregated node, wherein a security level of the third set of security overlay nodes is equal to or greater than a security level of the first set of security overlay nodes and a security level of the second set of security overlay nodes.

2. The overlay system of 1, wherein the operation executed on the first base node and the second base node to create the aggregated node corresponds to at least one of a group consisting of a join operation and a merge operation.

3. The overlay system of 1, wherein the first base node has a first information value, the second base node has a second information value, and the aggregated node has a third information value that is equal to or greater than the first information value and the second information value.

4. The overlay system of 3, wherein the third information value is associated with one of a group consisting of (i) data contained within the aggregated node in consequence of the operation executed on the first base node and the second base node, and (ii) data generated by one or more non-security overlay nodes associated with the aggregated node.

5. The overlay system of 1, wherein the processing circuitry is further configured to:
receive a second stimulus associated with the overlay system, wherein the second stimulus is indicative of a request to access the aggregated node; and
generate an access right for the second stimulus based on one or more contexts of the second stimulus and one or more contexts of the third set of security overlay nodes, wherein the one or more contexts of the third set of security overlay nodes define access-granting characteristics associated with the aggregated node, whereas the one or more contexts of the second stimulus correspond to characteristics of the request, and wherein the second stimulus is processed based on the access right.

6. The overlay system of 5, wherein the processing circuitry is further configured to generate a rejection notification based on the access right indicating that access to the aggregated node is denied, and wherein the access to the aggregated node is denied based on the one or more contexts of the second stimulus being different from the one or more contexts of the third set of security overlay nodes.

7. The overlay system of 5, wherein the processing circuitry is further configured to execute an operation associated with the second stimulus based on the access right indicating that access to the aggregated node is granted, and wherein the access to the aggregated node is granted based on the one or more contexts of the second stimulus being a match to at least one context of the third set of security overlay nodes.

8. The overlay system of 7, wherein the aggregated node is an executable node and the execution of the operation associated with the second stimulus corresponds to execution of a non-security overlay node associated with the aggregated node.

9. The overlay system of 1,
wherein an overlay node type of each security overlay node of the first set of security overlay nodes is one of same and different,
wherein the overlay node type of each security overlay node of the second set of security overlay nodes is one of same and different, and
wherein the overlay node type of each security overlay node of the third set of security overlay nodes is one of same and different.

10. The overlay system of 1, wherein one or more overlay node types associated with the third set of security overlay nodes are different from one or more overlay node types associated with the first set of security overlay nodes and one or more overlay node types associated with the second set of security overlay nodes.

11. The overlay system of 1, wherein a number of overlay nodes of the third set of security overlay nodes is different from a number of overlay nodes of the first set of security overlay nodes and a number of overlay nodes of the second set of security overlay nodes.

12. The overlay system of 1, wherein each of the first set of security overlay nodes, the second set of security overlay nodes, and the third set of security overlay nodes comprises at least one of a group consisting of:
a role overlay node that defines a list of roles that have permission to access the corresponding node,
a user overlay node that defines a list of users, associated with a role of the list of roles, that have permission to access the corresponding node,
an access overlay node that defines one or more user access privileges for the corresponding node,
a policy overlay node that defines one or more rules that govern access to the corresponding node,
an encryption overlay node that encodes data of the corresponding node, and
an obfuscation overlay node that creates an obfuscated version of the data of the corresponding node.

13. The overlay system of 1, wherein each set of security overlay nodes of the first set of security overlay nodes, the second set of security overlay nodes, and the third set of security overlay nodes defines a list of access control elements that control access to the corresponding node, and wherein an access control element corresponds to at least one of a group consisting of (i) a role that has permission to access the corresponding node, (ii) a user, associated with the role, that has permission to access the corresponding node, (iii) a user access privilege for the corresponding node, and (iv) a rule that governs access to the corresponding node.

14. The overlay system of 13, wherein the list of access control elements associated with the third set of security overlay nodes does not exceed the list of access control elements associated with the first set of security overlay nodes and the list of access control elements associated with the second set of security overlay nodes.

15. The overlay system of 13, wherein the list of access control elements associated with the third set of security overlay nodes is mutually exclusive to the list of access control elements associated with the first set of security overlay nodes and the list of access control elements associated with the second set of security overlay nodes.

16. The overlay system of 13, wherein the list of access control elements associated with the third set of security overlay nodes extends the list of access control elements associated with the first set of security overlay nodes and the list of access control elements associated with the second set of security overlay nodes.

17. The overlay system of 1,
wherein the first base node is part of a first node group, and the first set of security overlay nodes is associated with the first node group such that the first base node inherits the first set of security overlay nodes from the first node group,
wherein the second base node is part of a second node group, and the second set of security overlay nodes is associated with the second node group such that the second base node inherits the second set of security overlay nodes from the second node group, and
wherein the aggregated node corresponds to a third node group that represents an aggregation of the first base node and the second base node, with the third set of security overlay nodes being dynamically associated with the aggregated node.

18. The overlay system of 1,
wherein the first base node, the second base node, and the aggregated node constitute a node group, such that the third set of security overlay nodes is associated with the node group, and
wherein the processing circuitry is further configured to:
receive a third stimulus indicative of a node addition operation;
create, based on the third stimulus, a third base node in the node group; and
dynamically associate a fourth set of security overlay nodes with the third base node such that a security level of the fourth set of security overlay nodes is equal to or greater than the security level of the third set of security overlay nodes.

19. The overlay system of 1, wherein the aggregated node is an edge node that defines a first connective relationship between the first base node and the edge node, and a second connective relationship between the second base node and the edge node.

20. The overlay system of 1,
wherein a security overlay node of the first set of security overlay nodes, the second set of security overlay nodes, and the third set of security overlay nodes is one of a group consisting of (i) a stateful overlay node and (ii) a stateless overlay node,
wherein based on the security overlay node being the stateful overlay node, an execution output associated with the security overlay node is persistent and is accessible to the processing circuitry for performing one or more access control operations on a corresponding node for a predefined time interval, and
wherein based on the security overlay node being the stateless overlay node, the execution output is non-persistent and processing logic associated with the security overlay node is re-executed based on a requirement of the execution output.

21. The overlay system of 1,
wherein each base node of the first plurality of base nodes and the aggregated data nodes comprises (i) a node template that corresponds to a predefined node structure and (ii) a node instance that corresponds to an implementation of the node template such that the plurality of base nodes comprises a plurality of node templates and a plurality of node instances, and
wherein the set of security overly nodes of the plurality of security overlay nodes corresponds to an overlay of the node instance.

22. A method, comprising:
receiving, by processing circuitry of an overlay system, a first stimulus associated with the overlay system, wherein an executable graph-based model, stored in a storage element of the overlay system, comprises a plurality of base nodes and a plurality of security overlay nodes, where each base node is associated with a set of security overlay nodes such that access to the corresponding base node is controlled by the set of security overlay nodes;
identifying, by the processing circuitry, based on the first stimulus, from the plurality of base nodes, at least a first base node and a second base node that are required for processing of the first stimulus, wherein the first base node and the second base node are associated with a first set of security overlay nodes and a second set of security overlay nodes, of the plurality of security overlay nodes, respectively;
executing, by the processing circuitry, an operation associated with the first stimulus on the first base node and the second base node to create an aggregated node that defines an association between the first base node and the second base node; and
dynamically associating, by the processing circuitry, a third set of security overlay nodes with the aggregated node, wherein a security level of the third set of security overlay nodes is equal to or greater than a security level of the first set of security overlay nodes and a security level of the second set of security overlay nodes.

What is claimed is:
1. An overlay system, comprising:
a storage element configured to store an executable graph-based model that comprises a plurality of base nodes and a plurality of security overlay nodes, where each base node is associated with a set of security overlay nodes that is configured to control access to the corresponding base node; and
processing circuitry that is coupled to the storage element, and configured to:
receive a first stimulus associated with the overlay system, wherein the first stimulus is indicative of association of two or more nodes;
identify, based on the first stimulus, from the plurality of base nodes, at least a first base node and a second base node required for processing of the first stimulus, wherein the first base node and the second base node are associated with a first set of security overlay nodes and a second set of security overlay nodes, of the plurality of security overlay nodes, respectively;
execute an operation associated with the first stimulus on the first base node and the second base node to create an aggregated node that defines an association between the first base node and the second base node; and
dynamically associate a third set of security overlay nodes with the aggregated node, wherein a security level of the third set of security overlay nodes is equal to or greater than a security level of the first set of security overlay nodes and a security level of the second set of security overlay nodes.

2. The overlay system of claim 1, wherein the operation executed on the first base node and the second base node to create the aggregated node corresponds to at least one of a group consisting of a join operation and a merge operation.

3. The overlay system of claim 1, wherein the first base node has a first information value, the second base node has a second information value, and the aggregated node has a third information value that is equal to or greater than the first information value and the second information value.

4. The overlay system of claim 3, wherein the third information value is associated with one of a group consisting of (i) data contained within the aggregated node in consequence of the operation executed on the first base node and the second base node, and (ii) data generated by one or more non-security overlay nodes associated with the aggregated node.

5. The overlay system of claim 1, wherein the processing circuitry is further configured to:
receive a second stimulus associated with the overlay system, wherein the second stimulus is indicative of a request to access the aggregated node; and
generate an access right for the second stimulus based on one or more contexts of the second stimulus and one or more contexts of the third set of security overlay nodes, wherein the one or more contexts of the third set of security overlay nodes define access-granting characteristics associated with the aggregated node, whereas the one or more contexts of the second stimulus correspond to characteristics of the request, and wherein the second stimulus is processed based on the access right.

6. The overlay system of claim 5, wherein the processing circuitry is further configured to generate a rejection notification based on the access right indicating that access to the aggregated node is denied, and wherein the access to the aggregated node is denied based on the one or more contexts of the second stimulus being different from the one or more contexts of the third set of security overlay nodes.

7. The overlay system of claim 5, wherein the processing circuitry is further configured to execute an operation associated with the second stimulus based on the access right indicating that access to the aggregated node is granted, and wherein the access to the aggregated node is granted based on the one or more contexts of the second stimulus being a match to the one or more contexts of the third set of security overlay nodes.

8. The overlay system of claim 7, wherein the aggregated node is an executable node and the execution of the operation associated with the second stimulus corresponds to execution of a non-security overlay node associated with the aggregated node.

9. The overlay system of claim 1,
wherein an overlay node type of each security overlay node of the first set of security overlay nodes is one of same and different,
wherein the overlay node type of each security overlay node of the second set of security overlay nodes is one of same and different, and
wherein the overlay node type of each security overlay node of the third set of security overlay nodes is one of same and different.

10. The overlay system of claim 1, wherein one or more overlay node types associated with the third set of security overlay nodes are different from one or more overlay node types associated with the first set of security overlay nodes and one or more overlay node types associated with the second set of security overlay nodes.

11. The overlay system of claim 1, wherein a number of overlay nodes of the third set of security overlay nodes is different from a number of overlay nodes of the first set of security overlay nodes and a number of overlay nodes of the second set of security overlay nodes.

12. The overlay system of claim 1, wherein each set of security overlay nodes of the first set of security overlay nodes, the second set of security overlay nodes, and the third set of security overlay nodes comprises at least one of a group consisting of:
a role overlay node that defines a list of roles that have permission to access a corresponding node,
a user overlay node that defines a list of users, associated with a role of the list of roles, that have permission to access the corresponding node,
an access overlay node that defines one or more user access privileges for the corresponding node,
a policy overlay node that defines one or more rules that govern access to the corresponding node,
an encryption overlay node that encodes data of the corresponding node, and
an obfuscation overlay node that creates an obfuscated version of the data of the corresponding node.

13. The overlay system of claim 1, wherein each set of security overlay nodes of the first set of security overlay nodes, the second set of security overlay nodes, and the third set of security overlay nodes defines a list of access control elements that control access to a corresponding node, and wherein an access control element corresponds to at least one of a group consisting of (i) a role that has permission to access the corresponding node, (ii) a user, associated with the role, that has permission to access the corresponding node, (iii) a user access privilege for the corresponding node, and (iv) a rule that governs access to the corresponding node.

14. The overlay system of claim 13, wherein the list of access control elements associated with the third set of security overlay nodes does not exceed the list of access control elements associated with the first set of security overlay nodes and the list of access control elements associated with the second set of security overlay nodes.

15. The overlay system of claim 13, wherein the list of access control elements associated with the third set of security overlay nodes is mutually exclusive to the list of access control elements associated with the first set of security overlay nodes and the list of access control elements associated with the second set of security overlay nodes.

16. The overlay system of claim 13, wherein the list of access control elements associated with the third set of security overlay nodes extends the list of access control elements associated with the first set of security overlay nodes and the list of access control elements associated with the second set of security overlay nodes.

17. The overlay system of claim 1,
wherein the first base node is part of a first node group, and the first set of security overlay nodes is associated with the first node group such that the first base node inherits the first set of security overlay nodes from the first node group,
wherein the second base node is part of a second node group, and the second set of security overlay nodes is associated with the second node group such that the second base node inherits the second set of security overlay nodes from the second node group, and
wherein the aggregated node corresponds to a third node group that represents an aggregation of the first base node and the second base node, with the third set of security overlay nodes being dynamically associated with the aggregated node.

18. The overlay system of claim 1,
wherein the first base node, the second base node, and the aggregated node constitute a node group, such that the third set of security overlay nodes is associated with the node group, and
wherein the processing circuitry is further configured to:
receive a third stimulus indicative of a node addition operation;
create, based on the third stimulus, a third base node in the node group; and
dynamically associate a fourth set of security overlay nodes with the third base node such that a security level of the fourth set of security overlay nodes is equal to or greater than the security level of the third set of security overlay nodes.

19. The overlay system of claim 1, wherein the aggregated node is an edge node that defines a first connective relationship between the first base node and the edge node, and a second connective relationship between the second base node and the edge node.

20. A method, comprising:
- receiving, by processing circuitry of an overlay system, a first stimulus associated with the overlay system, wherein an executable graph-based model, stored in a storage element of the overlay system, comprises a plurality of base nodes and a plurality of security overlay nodes, where each base node is associated with a set of security overlay nodes such that access to the corresponding base node is controlled by the set of security overlay nodes;
- identifying, by the processing circuitry, based on the first stimulus, from the plurality of base nodes, at least a first base node and a second base node that are required for processing of the first stimulus, wherein the first base node and the second base node are associated with a first set of security overlay nodes and a second set of security overlay nodes, of the plurality of security overlay nodes, respectively;
- executing, by the processing circuitry, an operation associated with the first stimulus on the first base node and the second base node to create an aggregated node that defines an association between the first base node and the second base node; and
- dynamically associating, by the processing circuitry, a third set of security overlay nodes with the aggregated node, wherein a security level of the third set of security overlay nodes is equal to or greater than a security level of the first set of security overlay nodes and a security level of the second set of security overlay nodes.

* * * * *